United States Patent [19]

Parrish et al.

[11] Patent Number: 5,117,350
[45] Date of Patent: May 26, 1992

[54] MEMORY ADDRESS MECHANISM IN A DISTRIBUTED MEMORY ARCHITECTURE

[75] Inventors: Osey C. Parrish, Lauderdale Lakes; Robert E. Peiffer, Jr.; James H. Thomas, both of Plantation, all of Fla.; Edwin J. Hilpert, Jr., Greenbelt, Md.

[73] Assignee: Flashpoint Computer Corporation, McLean, Va.

[21] Appl. No.: 284,529

[22] Filed: Dec. 15, 1988

[51] Int. Cl.⁵ .................. G06F 12/06; G06F 15/16
[52] U.S. Cl. .................. 395/425; 364/240.1; 364/242.95; 364/245; 364/245.2; 364/284.4; 364/DIG. 1
[58] Field of Search ............... 364/200, 900

[56] References Cited

U.S. PATENT DOCUMENTS 4,754,394 6/1988 Brantley et al. ................. 364/200

Primary Examiner—Gareth D. Shaw
Assistant Examiner—John C. Loomis
Attorney, Agent, or Firm—Sughrue, Mion, Zinn, Macpeak & Seas

[57] ABSTRACT

A computer system having plural nodes interconnected by a common broadcast bus. Each node has memory and at least one node has a processor. The system has a dynamically configurable memory which may be located within the system address space of a distributed system architecture including memory within each node having a processor and the memory resident within other nodes. The memory in the system address space is addressable by system physical addresses which are isolated from the physical addresses for memory in each node. The node physical addresses are translatable to and from the system physical addresses by partition maps located in partition tables at each node. Memory located anywhere in the distributed system architecture may be partitioned dynamically and accessed on a local basis by programming the partition tables, stored in partitioning RAMs. The use of the partitioning process permits data to be duplicated throughout a distributed system architecture and permits read cycles for shared data to execute at local bus speeds.

35 Claims, 21 Drawing Sheets (FIG. 4B, FIG. 4C)

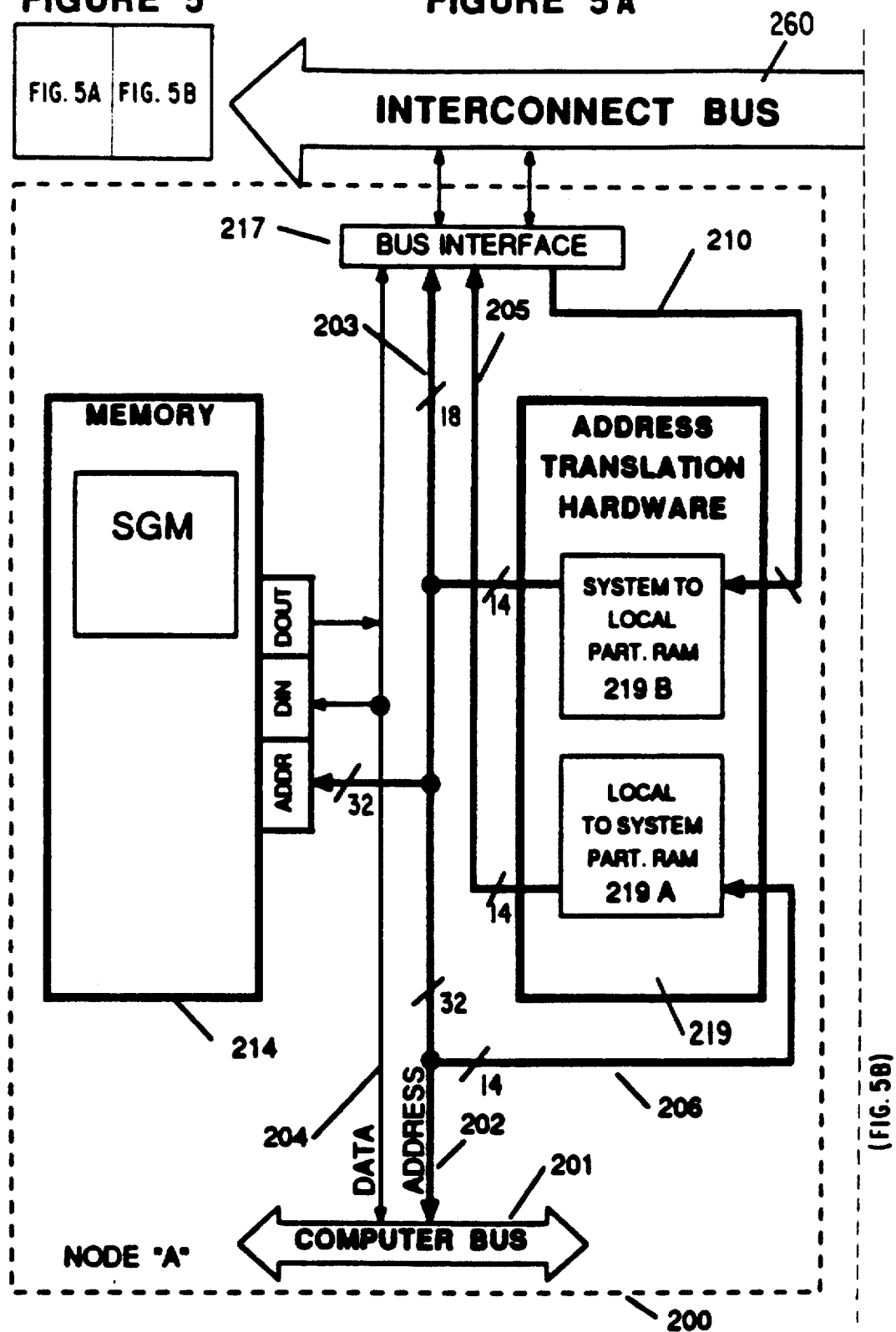

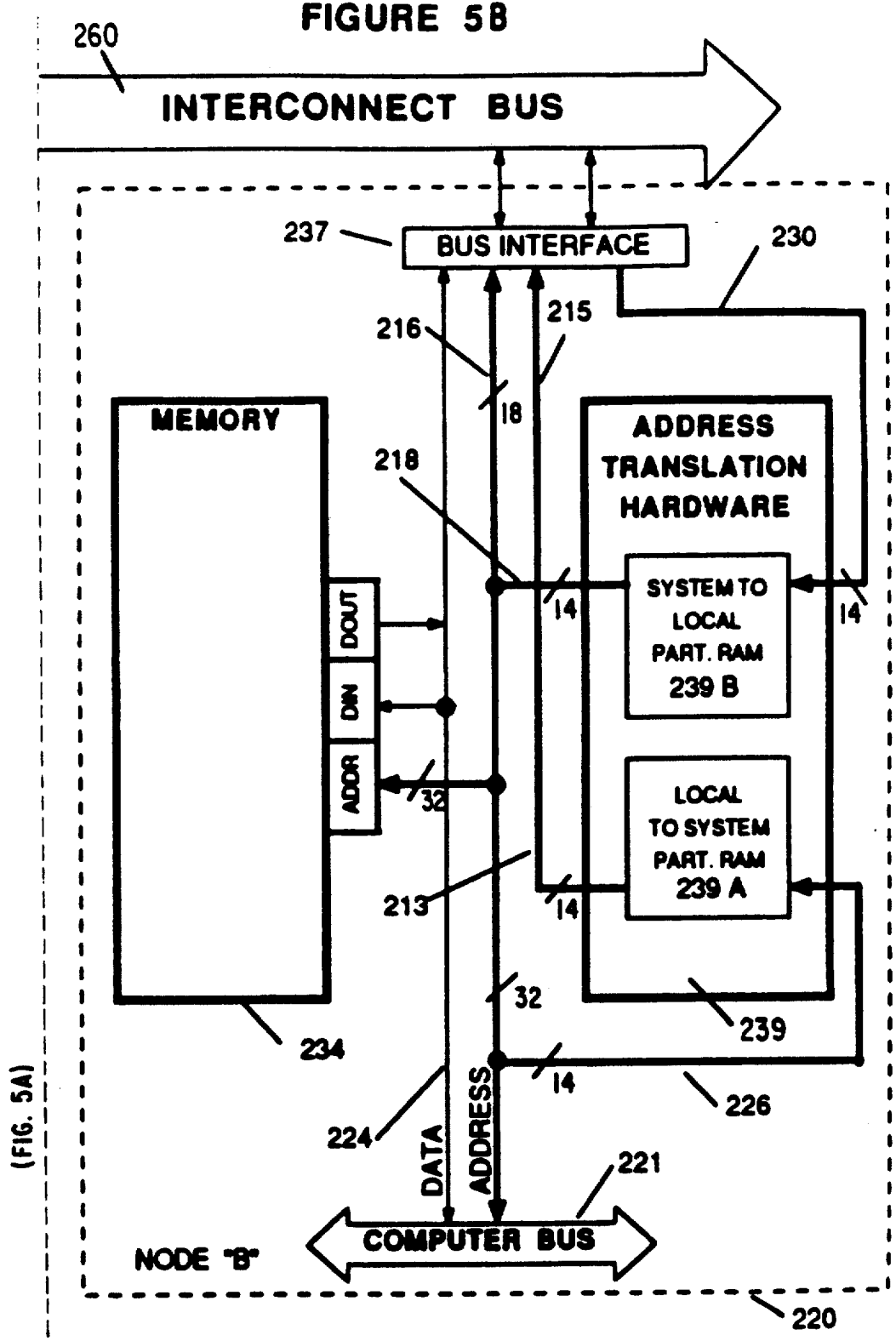

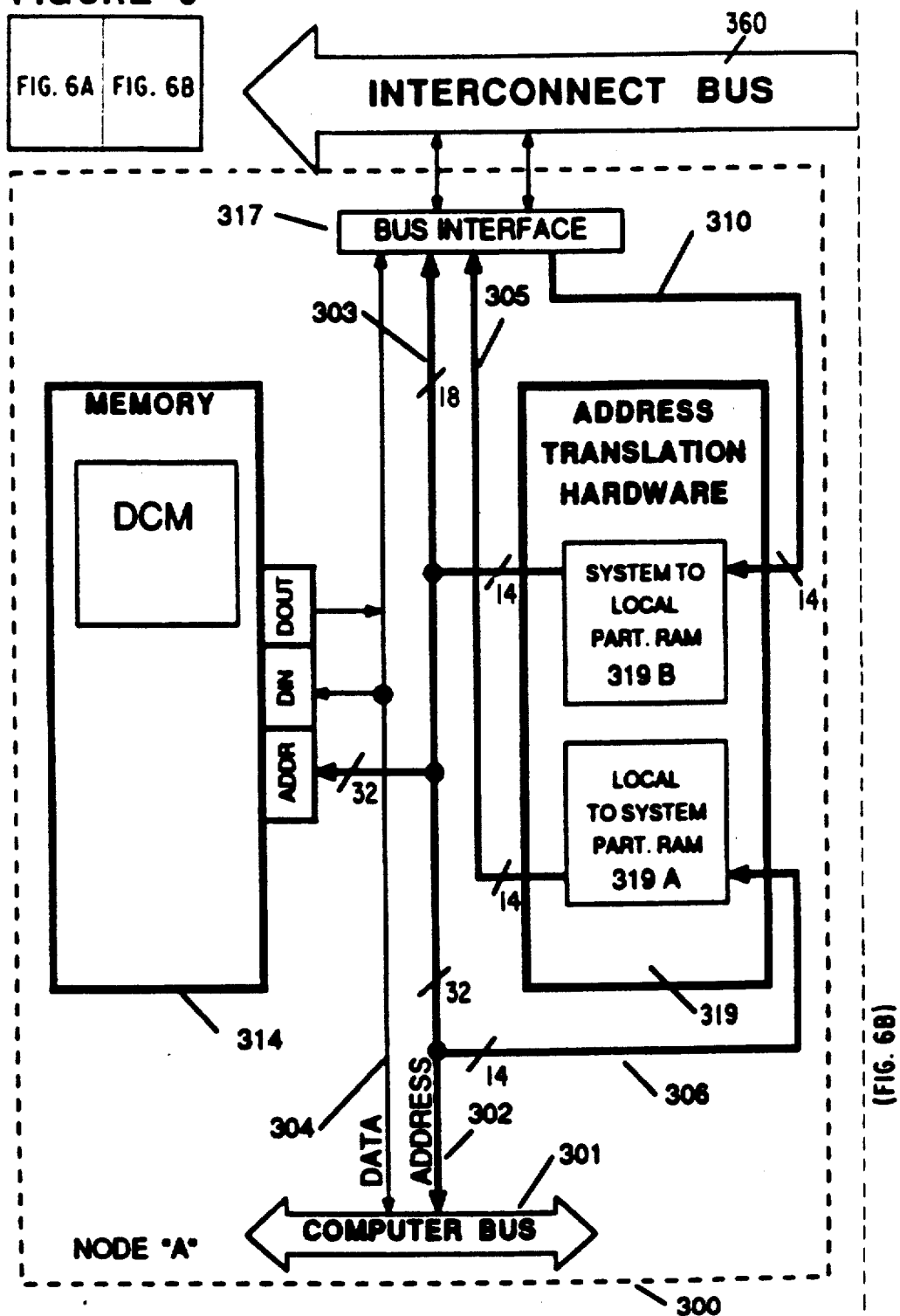

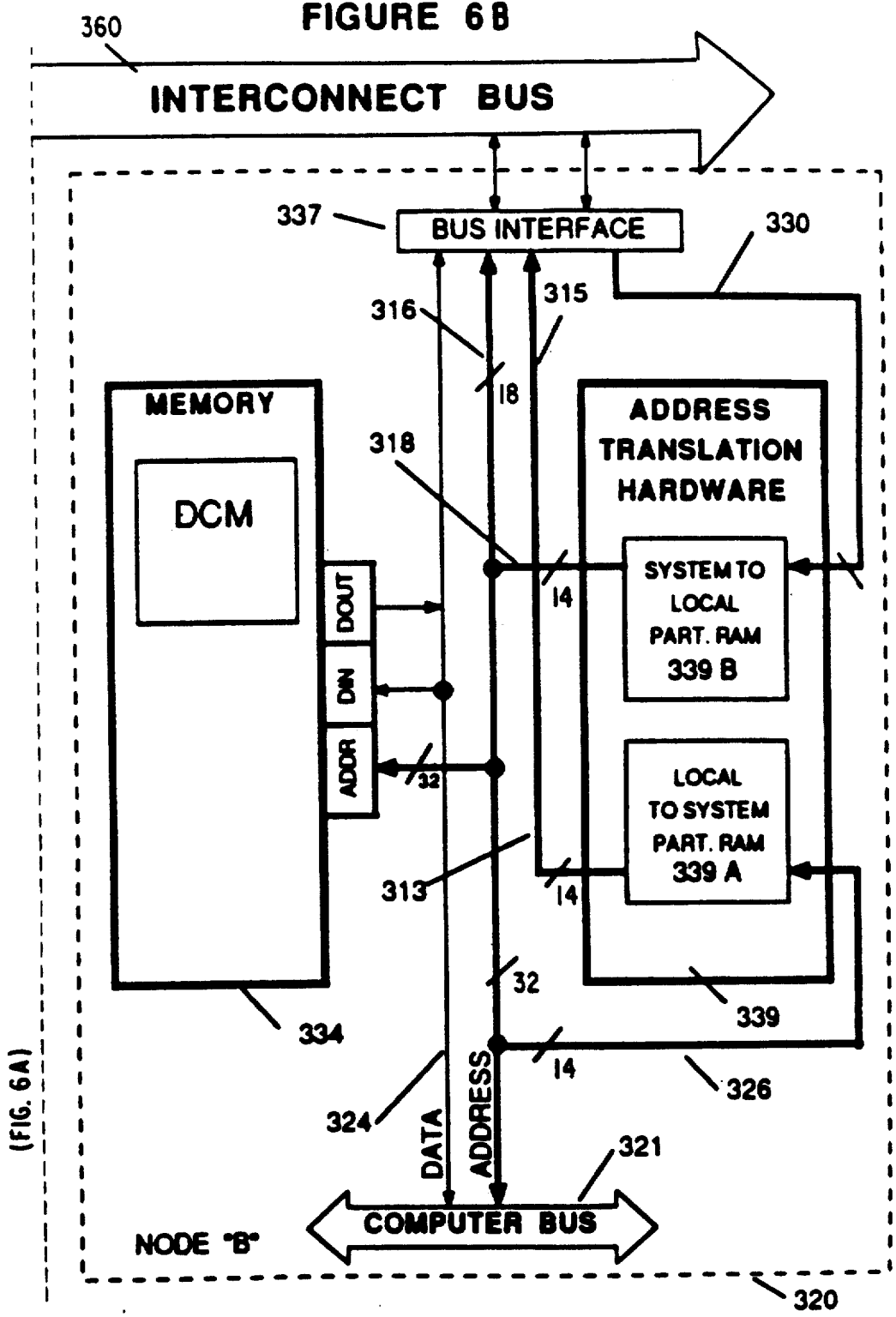

MEMORY ADDRESS MECHANISM IN A DISTRIBUTED MEMORY ARCHITECTURE

BACKGROUND OF THE INVENTION

1. Field Of The Invention

The present invention relates to digital computers and specifically, to the apparatus used to connect memory units that store shared information to the functional elements of a digital computer, including units for central processing and Input/Output. The present invention applies to multiprocessor, multicomputer or network systems operating across a parallel or serial bus structure for distribution of information in a common environment. The invention facilitates software control of the storage and retrieval of data in a distributed architecture.

2. Description Of The Prior Art

Computer memory architecture conventionally has been organized for shared use, wherein a central processing unit (CPU) uses the memory for storage of programs and data and shares a common memory read/write path, typically a bus with Input/Output (I/O) devices. The read/write format employed in such architecture typically consists of a first group of binary bits which represent a specific memory location and second group of binary bits which represent information. The bits representing a specific memory location are called the "memory address". The bits representing the information are called "data". Both groups of bits are transmitted during a "write cycle" to the memory unit which decodes the address bits to determine a physical location and stores the information bits at that location. During a "read cycle" the address bits are transmitted by a requesting unit, along with a control bit representing a read request, to the memory unit. The memory control logic retrieves the data from the specified address and returns the data over the data bus to the requesting unit. The transmission of both address and data on a common bus during a single bus cycle is conventionally designated as a "value" transfer.

Early computer designs typically had a limited memory addressing capability (represented by the number of address bits the CPU could generate) and addressed the memory in a direct addressing mode. The address generated by the CPU was the same as the real physical address decoding a specific memory location. The size of the program processed by the CPU was limited to the size of the memory.

Later system designs increased the size of the address field generated by the CPU in order to increase program and data storage capacity. This type of system still required a generation of the real physical address of the memory.

Some designs allowed multiple programs to exist in system memory simultaneously, requiring that two levels of addressing be maintained. These two levels were the address space of the program e.g. the physical address of the program within physical memory and the logical addressing with the program done. All logical addresses started at address zero. The addressing scheme was facilitated through the use of mapping units that resolved the address differences.

The direct addressing of memory in a multiprogram machine created a problem called "memory fragmentation." This problem was caused when programs of different sizes were being loaded, executed and deleted. As a result, gaps in memory utilization were created since a large program could not be loaded into an area vacated by a small program. The solution to the fragmentation problem was an address translator which converted the CPU-generated addresses into "memory addresses." In this process, referred to as "memory mapping," the CPU generates a contiguous logical memory address which is converted into a real physical memory address. Memory mapping also permits program code to be stored in physical memory locations that are not contiguous.

Recent developments in CPU technology permit execution cycles which exceed the speed of memory cycles. This was achieved by the implementation of special high speed static RAMs (Random Access Memories) located adjacent to the CPU. These RAMs (called "cache memory") duplicated portions of the contents of main memory, but were smaller in storage capacity due to both their smaller physical size and their high cost. Cache memory allowed the CPU to execute at speeds faster than the main memory cycle time when the referenced instruction or operand was located in the cache memory. The cache memory is typically addressed with a physical address which has been translated by a memory map unit. The data referenced by the physical address is supplied by the cache when the block of memory containing that data is present in cache however, the address is rerouted to the main memory for fulfillment when that data is not present. When using cache memory, the same address will describe two separate physical locations in duplicated memory blocks, one in cache and one in main memory. In this case, the faster memory (cache) determines if the slower memory (main) is to be accessed. However, when cache memory is shared by several processors, the advantages of caching shared memory regions ordinarily is lost.

Another recent addressing technique permits the program(s) being executed to be larger than available memory. This technique employs a "virtual memory" and can be viewed as utilizing main memory as a cache memory for the system disk. Using a virtual memory, the program size can exceed the size of the main memory since only a portion of the executing program physically resides in main memory. In addition, multiple programs whose total size exceeds main memory capacity can be executed concurrently since only a small portion of each executing program is resident in the main memory at any given instant Operationally, the memory addresses may be grouped into "pages" of N bytes and assigned for program usage by the operating system software. The CPU generates logical addresses which are mapped into main memory physical addresses and used to access the content of main memory for program execution. However, when the virtual address circuitry detects a fault (i.e.. the CPU generated logical address is not contained in a valid page located in main memory), the logical address is converted into a disk address, and a page that contains the referenced address is loaded into main memory for program execution. Current virtual memory machines are implemented using memory mapping and cache designs for efficient use of memory.

A detailed explanation of current memory address structures is provided in "Computer Storage Systems & Technology", Richard E. Matick, 1977 and in the "Encyclopedia of Computer Science and Engineering", Anthony Ralston, Editor, 1983.

The information path employed in the system architecture also is relevant to the efficient use of memory. For example IEEE standard P1014 teaches the use of multiple paths between functional units through its definition of the VMEbus, the VSB sub-bus, and the VMS serial sub-bus.

The Motorola VMEbus Products Selector Guide 1988 (BR606/D). lists a model MVME 132DOF processor module as containing both a VME and a VSB bus interface. The Guide also lists memories which are dual ported between the VME and VSB buses (e.g., MVME224-2 Dual Ported Memory) These products embody the use of the VME bus as a transmit/write or receive/read bus and the VSB bus as a receive/read bus. The selection of a particular bus for a given communication is performed by bits external to a 32 bit address field. These additional bits enable the same physical address to select different paths to a common data location. Two dual ported memories are used, each operating in a slave mode with the same physical address, and are connected in common to a VME bus and are connected to separate VSB buses. This bus and memory structure demonstrates the use of a single write function for storing information into two physical locations which have two separate read paths.

Another example of a single transmit/write function selecting multiple duplicated locations is the system developed by the Gould Computer Systems Division and marketed as "Reflective Memory". This system defines a memory address "block" with a starting address and an ending address. The block encompasses all inclusive addresses and may reside in one of several dual-ported system memories. Transmit/write transactions to this address space are routed to a secondary bus that is connected to all participating functional units through one of the two ports for each memory. The port interface has the capability to convert the secondary bus address to a different address for an address block in the functional unit memories through a set of physical jumpers which perform a one-to-one conversion based on the placement of the jumpers. A start jumper and an end jumper define the boundaries for addresses in each block of memory.

All of the described prior art memory schemes, including those that employ both a VME and VSB bus with dual-ported memories concern computing systems in which plural functional units are connected by common bus structures that operate to transmit values using a transaction process. Such busses have several lines dedicated to the transmission of an address field and other lines dedicated to the transmission of data. The address information generated by CPU's in the system identifies local logical addresses and system physical addresses that have a predefined static relationship to system memories having a static configuration. The system memory may be a remote resource that is shared among several other functional units. However, the system memory is not dynamically configurable in such a way as to allow allocation of memory capacity to individual units based on need. No means of communicating the information needed to perform the requisite memory allocation and commitment at the start of each task is available, because a bus employing a transaction process cannot support the underlying communication. Memory allocations in such architectures necessarily are fixed, although the mechanical allocation of memory can occur through the use of jumpers. Accordingly, those prior art memory structures are ineffective in providing efficient use of global or shared memories in a multicomputer environment.

A unique bus structure that permits the use of both a transaction process and a message process is disclosed in U.S. patent application Ser. No. 07/232,155, filed Aug. 15, 1988 and entitled "Broadcast Bus with Multi-Level Arbitration" (Parrish et al), whose teachings are incorporated herein by reference. The bus' dual mode design supports point-to-point and point-to-multipoint transactions (the latter permits a single transmit/write to several physical locations). The message process permits the sharing of control information (e.g.. parameters) among two or more functional units such information being useable for several operational purposes, including the dynamic configuration of memory. The unique arbitration scheme described in that application assures the priority transmission of single cycle unmasked requests and the effective transmission of multiple cycle masked requests that may control the configuration process. The disclosed bus architecture is particularly useful in supporting a high-speed, multicomputer, multiprocessor or network interconnect systems having a distributed processing capability.

A primary object of the present invention is to provide a memory structure which supports a high speed multicomputer, multiprocessor or network interconnect system with distributed computational capabilities.

A further object of the present invention is to provide a memory structure which supports a multicomputer, multiprocessor or network system capable of being used on diverse applications.

A further object of the present invention is to provide a reliable high speed memory structure for storing and retrieving bi-directional communications in a common address space environment.

A further object of the present invention is to provide a method for the transfer of information between two or more functional units connected to a secondary bus.

A further object of the present invention is to provide a method for cache memory to be used on shared information, i.e.. to cache any data in distributed memory space.

A further object of the present invention is to support a memory structure which will allow multiple functional units to operate on a common body of data.

A further object of the present invention is to support a memory structure that will allow memory to be dynamically allocated as a system resource.

SUMMARY OF THE INVENTION

The present invention concerns a dynamically configurable memory, which may be located anywhere in a distributed system architecture, and is addressable as local bus memory. A translation mechanism is used to convert local bus memory addresses to secondary interconnect bus memory addresses for data distribution in a distributed multicomputer, multiprocessor or network system. The mechanism may comprise partitioning RAMs at each functional unit which respond to an input address and readout a stored translation address. The invention applies to any secondary interconnection bus structure whether parallel or serial, that presents selected memory addresses and data transfers to all functional units attached to the bus structure.

The present invention allows the partitioning of memory located anywhere in distributed system architecture. The partitioning may occur dynamically because the memory partitions are created by the use of software-controlled entries in partitioning tables stored in partitioning RAMs. Access to a memory partition may be software assigned to one or more functional units in the distributed system architecture. A memory partition may be located in any functional unit and may have the same system address as memory partitions located in other functional units. In this manner, data may be duplicated throughout a distributed system architecture and, thereby allow read cycles for shared data to execute at local bus speeds.

The invention allows the creation by software of three classes of memory: Shared Global, Remote Global and Distributed Common. Requests for an allocation of memory for any of these three types of memory regions are synchronized by messages broadcast one at a time via a common bus and by the partitioning RAM's software operating under distributed control. Thus, two separate and unrelated tasks may not be allocated the same address range of memory unless they specifically need to share the data. Distributed control also supports cache invalidation for all of the memory formats by converting applicable system addresses to local addresses for cache invalidation thereby permitting each local computer to cache any area of its defined memory space.

BRIEF DESCRIPTION OF THE DRAWINGS

FIGS. 5, 5A and 5B are a schematic diagram which embodies the present invention when used with shared global memory.

FIGS. 6, 6A and 6B are a schematic diagram which embodies the present invention when used with distributed common memory.

DESCRIPTION OF THE PREFERRED EMBODIMENT

Figure 1:
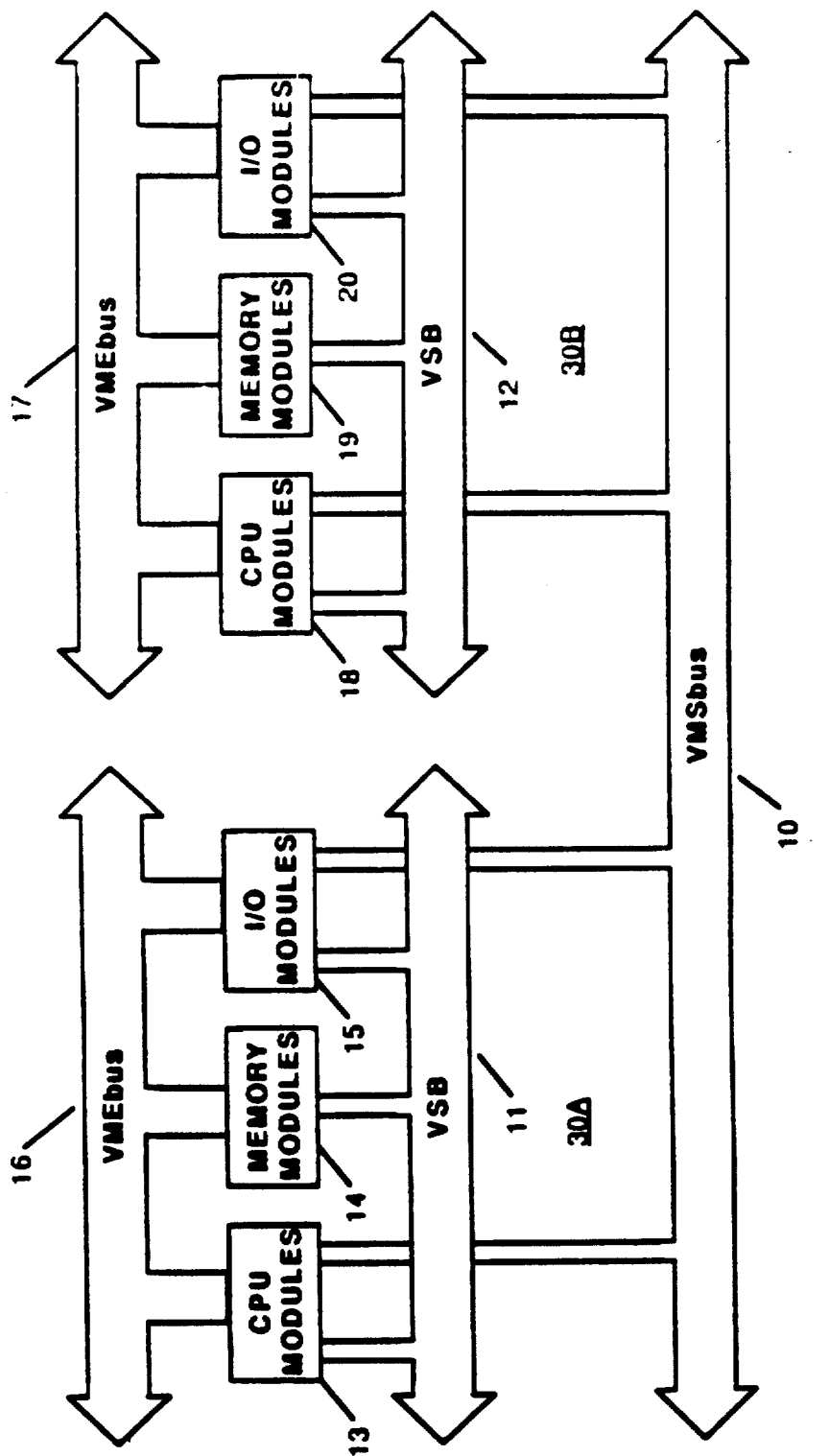
FIG. 1 is a schematic diagram of a conventional multicomputer constructed around the VME architecture.

FIG. 1 represents a schematic diagram of a prior art system described by industry specifications IEC 821 and IEEE P1014. The overall system 30 consists of two computer subsystems 30A and 30B interconnected by a serial VMS bus 10. The VMS bus 10 is used to exchange short messages between the modules located in the subsystems 30A and 30B. This bus supports a system architecture that provides redundancy and permits the subsystems to be geographically separated. Subsystem 30A may consist of CPU Modules 13, Memory Modules 14, and I/O Modules 15. All of these modules are interconnected by a main system bus 16, preferably a VMEbus. The VMEbus is a high speed parallel path consisting of 32 bits for address and 32 bits for data. The bus is operated via a transaction process with an asynchronous, non-multiplexed bus protocol and is capable of supporting data transfer rates up to 40 Megabytes per second (Mb/s) in a 4 Gigabyte (GByte) linear address space. To meet complex high-speed application requirements, another interconnect path 11. e.g.. a VSBbus, may be added. The VSBbus forms a multiplexed 32-bit wide local bus extension that also operates via a transaction process. The purpose of this bus is to implement fast local systems, especially local memory extensions, which are globally connected via the VMEbus 16. The best system performance is achieved when the VSBbus 11 extension is used as a read-only path, which allows the VMEbus 16 to be the primary path for writing data, transmitting module status, and transmitting interrupts.

Communication among the modules in subsystem 30A is accomplished by direct memory access via the common VMEbus and VSBbus connections.

In the prior art, if memory serves a plurality of functional units, the local physical addresses must all be the same if a common VME bus is used to connect those plural functional units. All of the CPUs in the functional units can access memory only in the same physical address space. Because of this constraint, there is a limitation on where shared memory in a distributed system can be placed, that limitation being the size of the available memory. The total memory address space in a system may comprise memory locations at one or more physical locations, including local memory and remote memory resources. However, access to that system memory space is by physical addresses that relate to the individual local unit capacity. The CPU will access distributed memory by issuing a logical address which is converted to a physical address in memory; however, there are significant limits on the memory address range that is available.

Subsystem 30B may be different from or totally redundant to subsystem 30A and may contain CPU Modules 18, Memory Modules 19 and I/O Modules 20 all interconnected by a VSBbus 12 and VMEbus 17. Subsystem intercommunication is accomplished across the VMSbus 10 using a message process, rather than a transaction process employing a direct memory address/data format. This allows both systems to have independent 4 Gigabyte linear address spaces available for the various modules within each system. However, the structure of FIG. 1 permits the memory capacity of the two subsystems to be shared. Because the only connection between the two subsystems is a VMSbus, a message rather than value passing bus, memory and address information cannot be passed between the subsystems. This limitation inhibits direct data sharing and, thus, task distribution in a distributed system architecture.

The present invention is concerned with memory structures that permit data sharing among functional units within a single node based on an industry standard primary bus, e.g., the VMEbus, and among functional units in different nodes based on a dual mode secondary bus. The present invention describes a method of providing dynamic control over the access to shared data in a distributed architecture by providing a higher level address structure for transmission across a secondary bus, that structure for describing specific memory locations in a distributed environment. The use of a programmable memory address structure provides a means of addressing any specific memory location in a distributed architecture such as a multiprocessor system, a multicomputer system or a network system. This capability is realized by each functional unit's translating the "local physical address" into a "system physical address" which is transmitted to all functional units in all other nodes via a secondary interconnection bus. Each functional unit also has the capability to translate received system physical addresses into local physical addresses. The translation function facilitates the partitioning of memory into manageable blocks through the use of address translation information in a partitioning table. The total system address space and granularity (i.e., minimum number of bytes per partition) are functions of the number of address bits generated by the functional units of the system, the selected length of the partitioning table, and the selected width of the table entry.

The address translation capability of the present invention provides the ability to create three classes of memory: Shared Global, Remote Global and Distributed Common.

The Shared Global Memory is allocated as a memory block with a system address that can be accessed by a single functional unit or a group of functional units. The memory may be physically located on any of the nodes and may be accessed by any other node of the multicomputer system, but any shared Global Memory partition is housed on one and only one node. Access is through interconnect bus writes and interconnect bus reads for the nodes that do not house the Shared Global memory partition and local writes and reads for the node that is housing the partition.

The Remote Global Memory is a large shared or private bulk memory providing multicomputers access to large common data areas. The Remote Global Memory is a separate memory module which is accessed by way of the secondary interconnect bus. Memory access is accomplished through interconnect bus writes and interconnect bus reads.

The Distributed Common Memory is physically distributed throughout the nodes. It comprises separate memory modules located in different nodes that respond to the same system physical address, although they may be located on different nodes. This memory is duplicated in each of the participating nodes and is written into with interconnect bus write transfers and is read through local bus read cycles. This provides a software definable shared memory for multicomputers with local memory access speeds.

The preferred embodiments of FIGS. 2-8 all employ programmable address translation hardware which partitions a local functional unit's 32 bits of physical memory address space into 16384 segments of system physical memory address space. A granularity of 256 KBytes per partition provides up to 4 GBytes of selective data sharing in a distributed environment. The address translation hardware further provides a capability of verifying whether the requesting unit has been granted access rights to the requested system address space.

Figure 2:
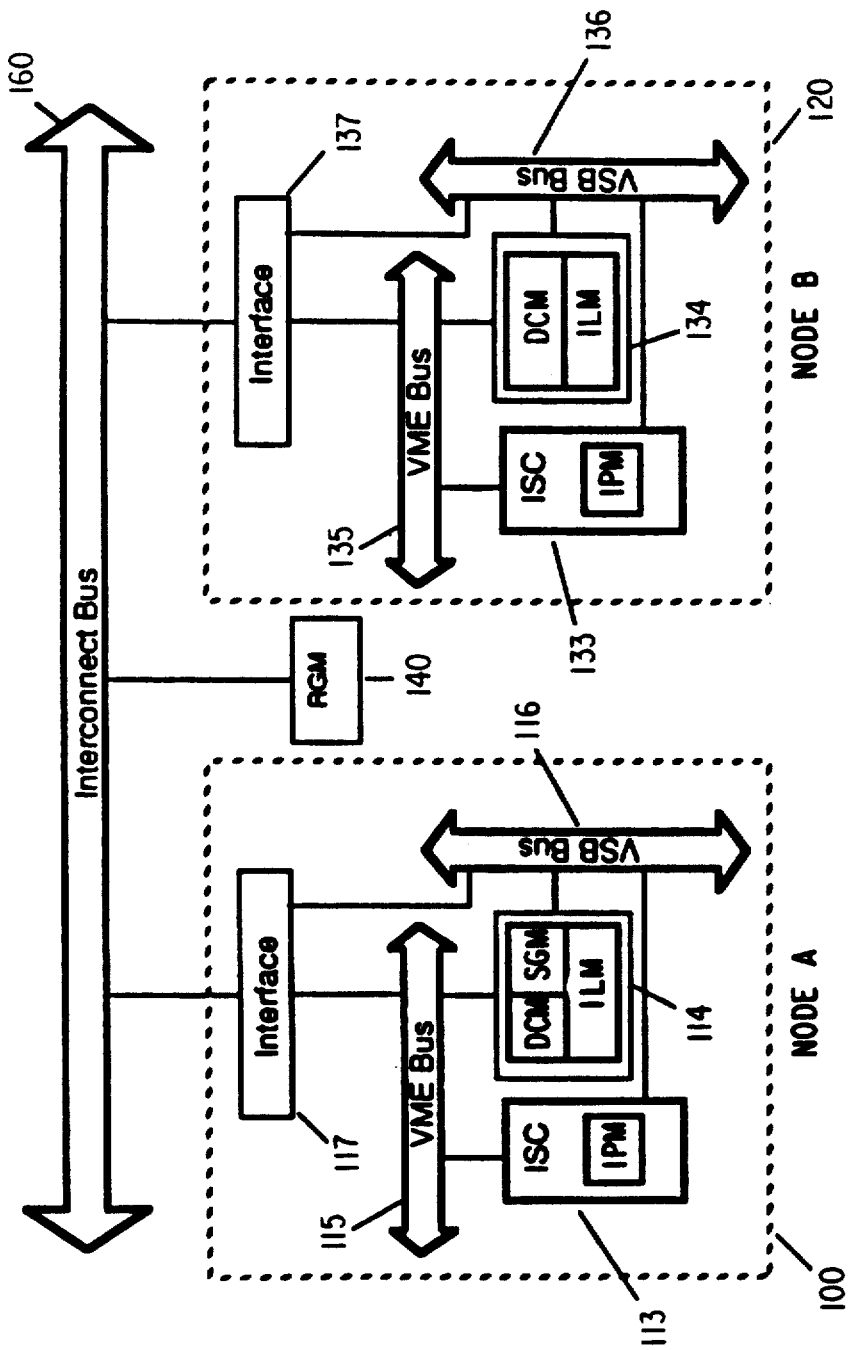
FIG. 2 is a block diagram of a two-node multicomputer and an example of where, topologically, the three different kinds of system memory can be located in accordance with the present invention.

FIG. 2 illustrates a distributed system architecture to which the present invention applies having a Node A 100 and Node B 120 and a remote global memory 140 interconnected by a system interconnect bus 160 of the type described in the above-referenced Parrish et al application. Although only two identical nodes are described, with identical elements referenced by numbers from both nodes, it would be obvious to one of ordinary skill in the art that multiple nodes can be used with the present invention and, further that those nodes can have varied configurations. Each node includes an industry standard digital computer (ISC) 113, 133 having its own private memory, identified as IPM in the memory table in the figure, that is connected to a local memory 114 134 via a VME bus 115, 135 and a VSB bus 116. 136, which together may be considered as a local computer bus. The local memory 114, 134 in the two nodes may be allocated to serve as ISC local memory (ILM) and may also provide a Distributed Common Memory and/or System Global Memory, identified as DCM and SGM, respectively, in the memory table in the figure. A Remote Global Memory (RGM) 140 provides a separate shared memory that is accessed by the nodes via the interconnect bus. The bus interface 117, 137 in each node provides access to Shared Global Memory and Remote Global Memory partitions within each node's memory. A software control program called the "system resource manager", executing within each ISC 113, 133 or in a separate coprocessor within each interconnect bus interface 117, 137, provides a distributed resource from which the operation of the interconnect bus and the allocation of system memory addresses, including the performance of partitioning functions and the establishment of partition RAM tables are conducted.

The present invention employs a software controlled memory addressing mechanism in a distributed architecture which allows the connection of functional units with similar and dissimilar memory sizes into a three-tiered address space. The prior art only could connect functional units with dissimilar memories by a two-tiered address space, wherein a logical address is mapped onto a physical address.

The three-tiered address space of the present invention further includes a local address space which is directly accessible by the functional unit(s) connected to the local bus in a single node and system address space which is a higher level address linking the local address spaces in several nodes. The system level address is transmitted across a secondary bus isolated from the local busses. The address space is further divided into partitions for ease of implementation in order to avoid creating a system address entry for each possible specific address in the addressable range of the functional units.

Figure 3:
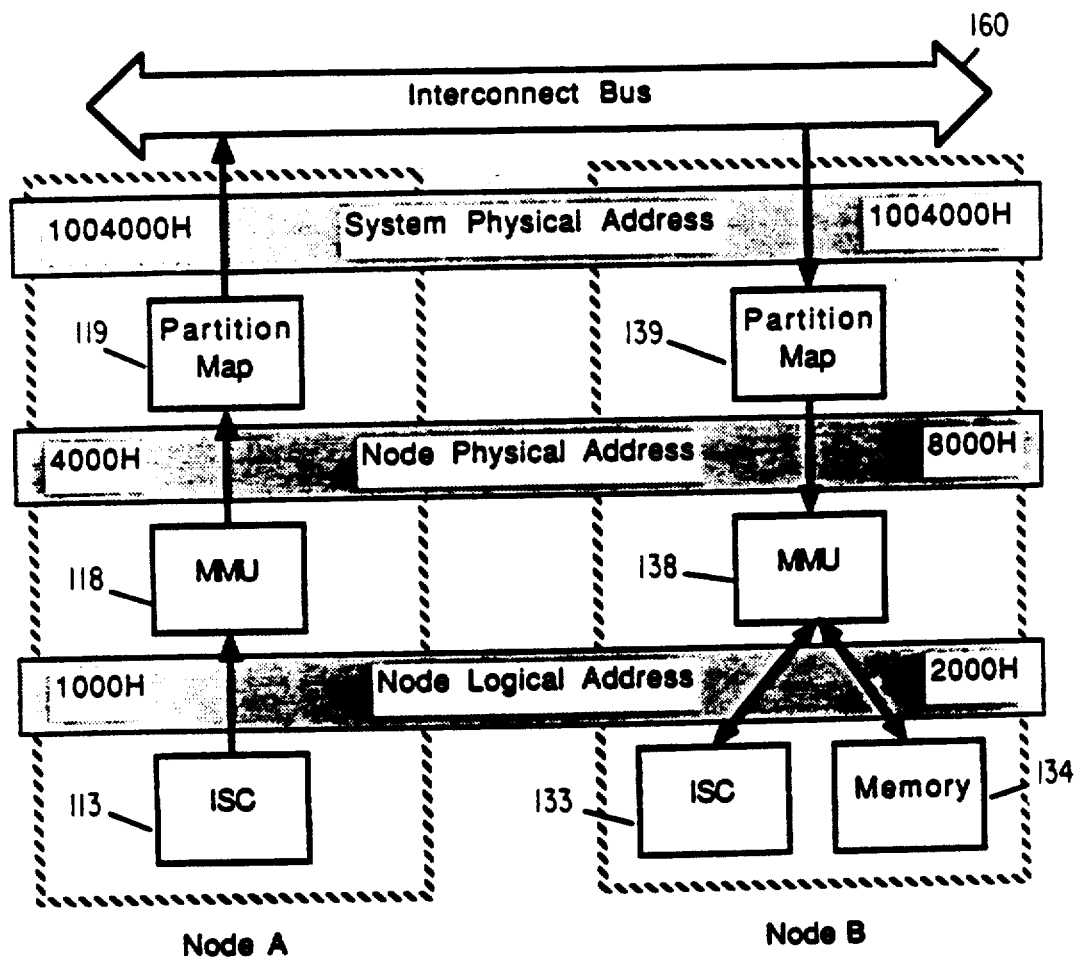
FIG. 3 is a block diagram illustrating the hierarchial address translations that occur with the present invention.

FIG. 3 illustrates the three-tiered address space of the present invention and the address translations that would occur in communicating between Node A and Node B via the interconnect bus 160 in the Figure. For example, the industry standard computer 113 Node A will issue a node logical address (1000H) on the local VME bus 115 and that logical address unit be translated by a memory map unit 118 into a node A physical address (4000H) suitable to access local memory. However, since the memory location may be remote or distributed in a multicomputer environment, a translation of the node physical address to a system physical address (1004000H) occurs via a programmable partition map 119. The system address is carried via the interconnect system bus 160 to all other nodes in the distributed system. When reserved by node B, the system physical address (1004000H) is converted by a programmable partition map 139 into a Node B physical address (8000H) and that address is converted by memory map unit 139 into the node logical address for access to node B memory. Similar translations occur when an industry standard computer at Node B wishes to access system memory. This three tier conversion allows the connection of local dissimilar addresses to the same partition entity.

To accomplish the Local/System address partitioning in the preferred embodiments, the 32-bit address field is broken down into two separate sections. For example, a mappable portion of the address may be provided by the 14 most significant bits. The remaining least significant 18 bits would be used as they are presented with no modification. This establishes a configuration wherein the 4 GBytes of addressable memory space is partitioned into 16,384 different addressable memory blocks, each block being 262,144 contiguously addressed bytes in size. To provide the remapping capability, the 14 most significant bits of the memory address field are used to address Random Access Memories (RAMs) which are 16,384 locations by a minimum of 15 bits in width. The 15 bit width provides for an output of 14 translated physical address bits plus a valid entry bit. The 16,384 locations provides the capability to convert each of the memory block addresses individually. In the preferred embodiment, two separate partition RAMs may be used at each node to accomplish a two-way conversion. One RAM converts physical addresses to system physical addresses, and the other RAM converts system physical addresses to local physical addresses. The 16,384 locations in each RAM may be programmed according to the system requirements for memory allocation. With this capability different areas and types of memory can be allocated to, or between units independent of each unit's local physical address requirements or restrictions.

Figure 4:
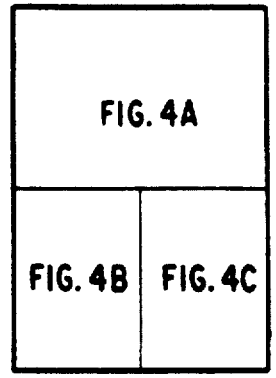
FIGS. 4, 4A, 4B, and 4C are a schematic digram which embodies the present invention when used with a remote global memory configuration.
Figure 4A:
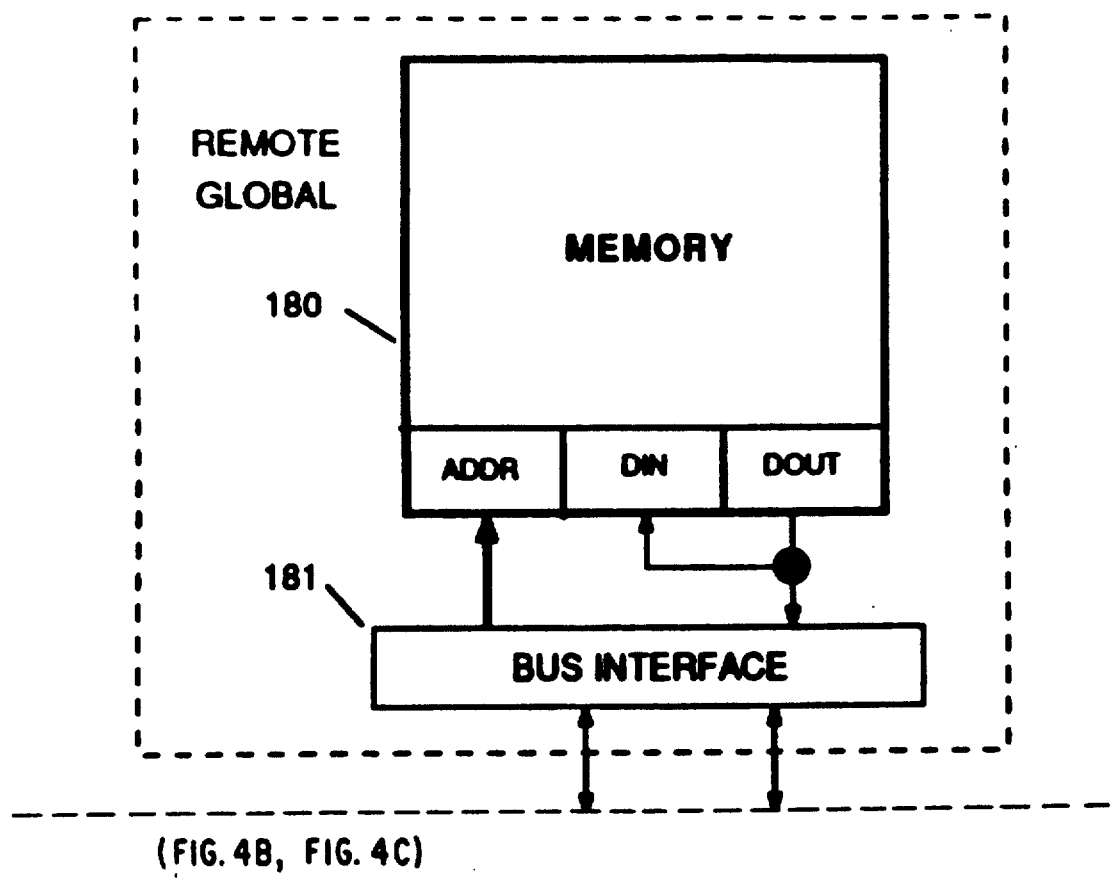
Figure 4B:
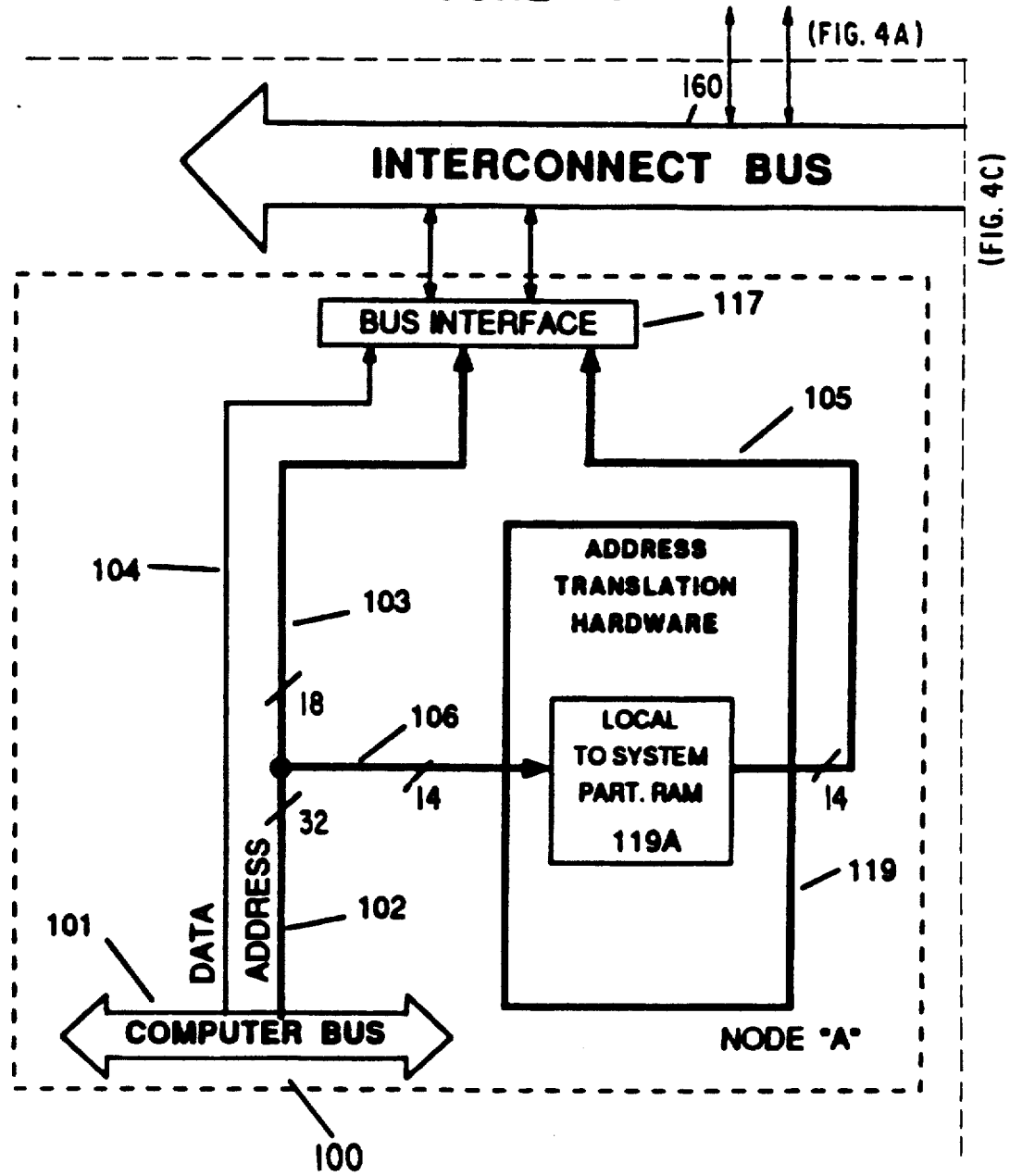
Figure 4C:
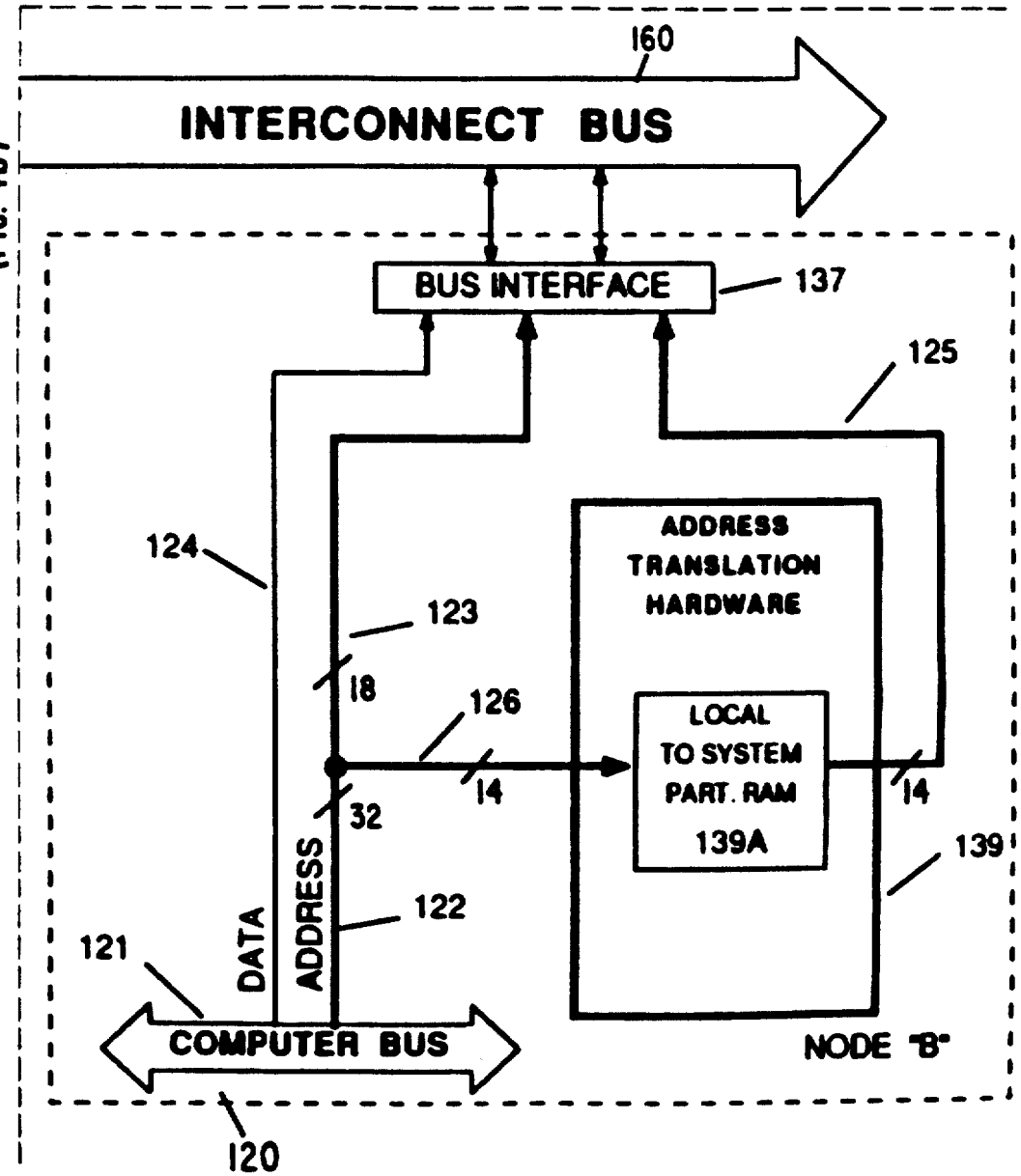

Referring to FIGS. 4A, 4B and 4C, a remote global structure in accordance with the present invention is illustrated. Prior art architectures which employ remote global memory connections have found difficulty in accommodating multiple types of computers in the same system and segmenting usable address space for such multiple-computer systems. Their remote memory addresses must reside outside of the range of any local or private memory space. Using the prior art, where interconnected systems have different amounts of local or private memory, the specified address ranges for the remote memory could at times be difficult to assign because they are limited to the address range of the node with the smallest address space. To compound the problem, the remote memory address area in the prior art could only be defined as a block region, with one block starting address and one block ending address. These regions required physical jumpers to define begin and end addresses on each block, as seen in the previously referenced Gould system. The use of partition RAMs in the present invention for address translation solves these problems.

Referring to the common structure of the connected Node A and Node B in FIGS. 4A, 4B, and 4C, the 32-bit memory addresses 102, 122 received from devices on the local computer busses 101, 121 are broken into two desired segments In the described implementation, one segment consists of the 14 most significant bits on which the translation is performed. This provides a translation granularity of 16,384 memory address blocks, each 262,144 bytes in size. The 14 most significant bits 106 126 are applied to the address translation hardware 119 139 comprising hardware routing logic (not shown) and local-to-system partition RAMs 119A, 139A while the remaining 18 bits 103, 123, used in their original state, are applied to the bus interfaces 117, 137. The address translation hardware comprises a grouping of gates that responds to the 14 most significant bits and causes an appropriate location in the partition RAM 119A. 139A to be read out. Each of the partition RAMs 119. 139 contain 16,384 locations to allow translation of each of the 16,384 block addresses. Each location of the partition RAMs is accessed by one of the 16,384 local physical block addresses represented by the 14 most significant bits. When the valid bit is true indicating authorized access, the 14 translated address bits 105, 125 are sent to the Bus Interfaces 117, 137 where they join the 18 true physical bits 103, 123 to make up the 32-bit system physical address that will be transmitted over the interconnect bus 160 to access the Remote Global Memory 180 via bus interface 181. Data 104, 124 accompanies the address information.

The Remote Global Memory 180 is structured to respond to a contiguous block of system physical addresses with a selected starting and ending address for the block range. When multiple Remote Global Memory modules or units are installed, they each would be assigned a different block address range.

Through the use of the partition RAMs and translated block sizes, areas of the Remote Global Memory can be configured as being dedicated to each node, or areas can be assigned as common or shared areas between the nodes with the translation mechanism resolving limitations due to any local physical address restrictions of the individual ISCs.

The very nature and purpose of a CPU operating with a cache-type memory, i.e., speed, mitigates against automatically updating cache memory every time the main memory is updated, the updates being required only when the updated information is needed in cache memory to respond to a demand for it during the next CPU cycle. The indication that cache memory is "dirty" i.e., not updated is provided via cache memory invalidation. However, cache memory invalidation is difficult where cache memory is to be used in a distributed memory space. The control of partition RAM loading supports cache memory invalidation for all of the distributed memory formats (e.g., on shared information) by converting applicable system addresses to local addresses for cache invalidation, thereby permitting each local computer to cache any area of its defined memory space. The current invention provides for cache memory invalidation by the address translation hardware on writes which occur as a result of the local computer or those which originate remotely.

In a second embodiment, it may be desirable to allow two or more nodes to share the same section of memory that is physically resident in the memory of one of the participating nodes, and the second type of shared memory is utilized. In this configuration, seen in FIGS. 5A and 5B, two sets of RAMs are used in the address translation hardware 219, 239 at each node. One RAM in each set 219A, 239A provides the translation from local physical to system physical and the other RAM 219B, 239B provides translation from system physical to local physical. In this way local to physical address conversion can be accomplished between the systems of Node A and Node B.

When Node B desires to share a section of the memory 214 in Node A, the address translation process allows System Node B to access this memory according to its local physical address requirements. For Node A, the memory area has been defined according to its local physical address requirements and is addressed directly from the 32 bit local address 202 received from the computer bus 201. For Node B to access this area, a local address received from its computer bus 221 is translated in the address translation hardware 239 by the local to system partition RAM 239A. When the valid bit is true, indicating authorized access, the 14 most significant bits 226 are applied via hardware routing logic to the partition RAM 239A. At the addressed partition RAM location, a system level address would have been stored according to the configuration requirements. The 14 bits of system physical address 213, (when the valid bit is true, indicating authorized access), are connected to the bus interface 237 along with the least significant 18 bits 223 received from the computer bus 221 to make up a 32 bit system physical address. The Node B bus interface 237 will issue the memory based transfer over the interconnect bus 260. The Node A bus interface 217 will receive the memory based transfer from the interconnect bus 260. Since this is an external memory access, the 14 most significant bits 210 of the system physical address are used to access the contents of the system-to-local partition RAM 219B in address translation hardware 219. At this location the desired local physical address would have been stored according to the configuration requirements. The accessed 14 bits of local address 208 are merged with the 18 least significant bits 203 which were received by the bus interface 217. This 32-bit value 202 is then used to address the memory 214 on Node A. The translated local physical address will be the same as the defined shared area for Node A. Similar signal flow and translation occurs for Node A access in the opposite direction to memory at Node B. In that case, the similarly identified and arranged elements in each node would operate in the same fashion, corresponding elements in Node B being identified by numbers 20 units higher than in Node A. Data flow into memory 214, 234 at each node is via the ports labeled DIN and out of memory via the ports labeled DOUT, in response to addresses appearing at the port labeled ADDR, as seen in the Figure.

Through the use of the partition RAMs and translated block sizes shared areas can be defined within the local memories of any of multiple nodes which may be accessed by any of other multiple nodes. The translation mechanism resolves limitations due to any local physical address restrictions of the individual systems.

It can be seen that the present invention has a greater amount of flexibility than do the prior art interconnecting structures. However, the remote global configuration of the present invention has a disadvantage in that remote access by some or all of the nodes is required. The present invention does permit the use of the translation and partitioning process to provide local access to system memory in a distributed common memory structure.

In this structure as seen in FIGS. 6A and 6B, it is desirable to maintain a copy of the shared information within the local memory of each node. With this structure write transfers addressed to the common area are accomplished in all of the nodes nearly simultaneously. The significant advantage of this structure is that the computer at any given node can read the common area by performing local reads which are inherently faster than remote reads.

To establish the Distributed Common Memory area, a section of each participating node's system's local memory is reserved and assigned according to its local physical address requirements. To provide common access, a system-level address block is assigned for this area. Within each node, the partition RAMs are set up to translate the specified address ranges. When one of the nodes generates a write to the local common address space, the 14 most significant bits are used to access the contents of the local-to-system partition RAM. The accessed data provides the 14 most significant bits of the system level address which has been assigned. The write transfer is performed within the local memory at the local physical address assignment. The translated system address is transmitted across the interconnect bus 360 along with the data to be written. Every node receives the transfer from the interconnect bus and performs the following actions. Since it is an external reference, the 14 most significant bits of the system level address are used to access the contents of the system-to-local partition RAM. The accessed data provides the 14 most significant bits of the local physical address which has been assigned. These, along with the original 18 least significant bits are used to perform the write transfer into the local memory on each participating node.

Through the use of the partition RAMs and translated block sizes, different distributed common areas can be defined for use between various numbers of nodes. In the previous discussions it can be seen that a great amount of flexibility is provided by the use of a system physical address implementation and the use of partition RAMs, which allows a finer granularity of the memory assignments. Through the use of the partition RAMs, all memory structures can be easily supported within the same system environment. The entries in the partition RAMs provide information to hardware routing logic in the address translation hardware which according to whether the entry is valid, allows the memory read or write to be transacted on the local bus, or the system interconnect bus.

Depending on how a system is implemented, the partition tables stored in the partition RAMs could instead be implemented with Programmable Read Only Memories (PROMs), which could be programmed according to a desired system memory configuration. As system requirements change the PROMs could be replaced or reprogrammed. However to provide maximum flexibility, RAMs are preferred, and a path should be provided to allow them to be dynamically reprogrammed while the systems are on line.

Figure 7:
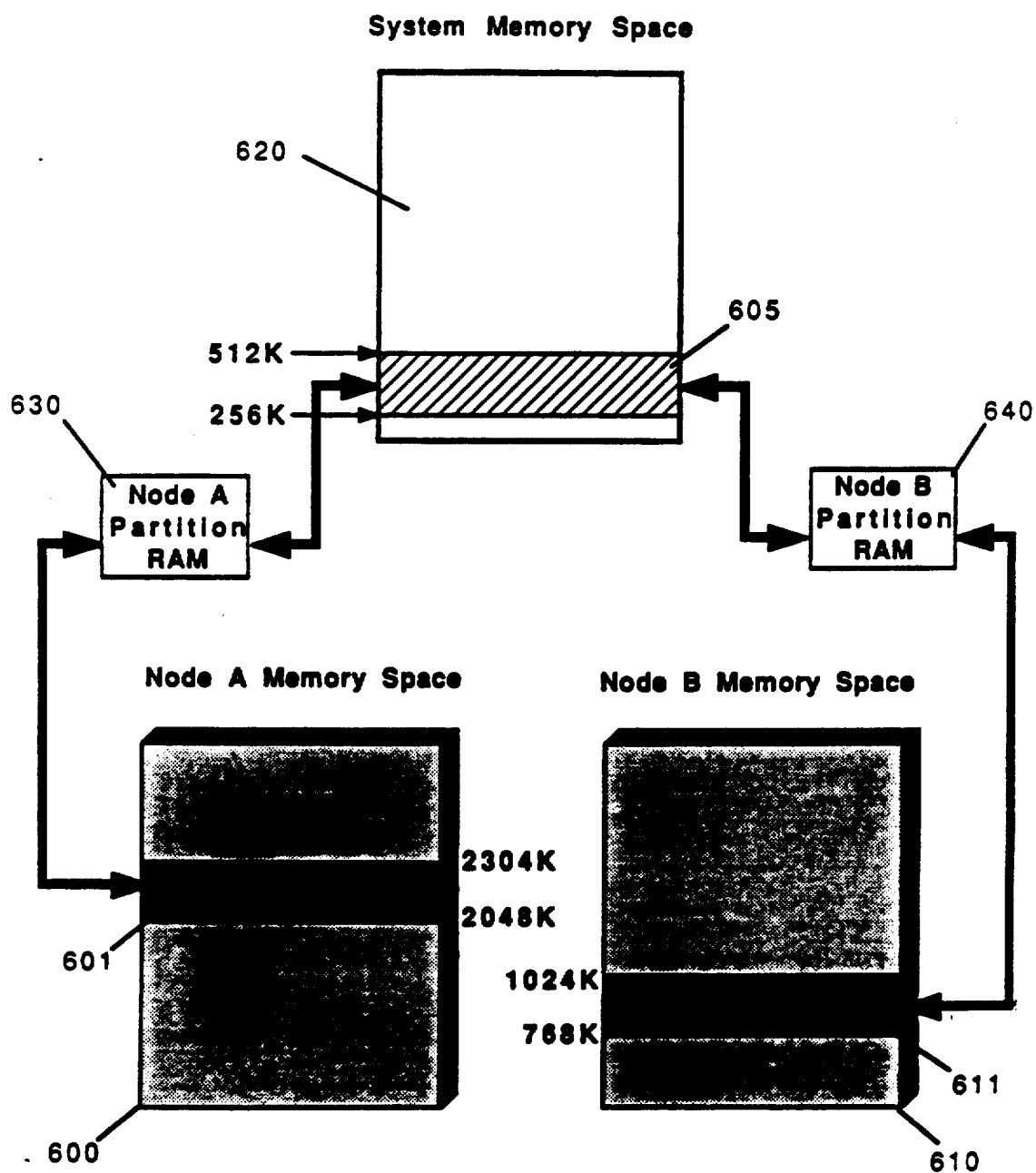
FIG. 7 is a schematic diagram illustrating an address mapping function for a distributed memory.

FIG. 7 shows a simple example of a distributed memory architecture, comprising Node A memory space 600, Node B memory space 610 and system memory space 620, wherein a distributed common memory partition is used. Two local memory partitions 601, 611 are associated with each other through a system memory partition 621. The two local partitions are mapped to the system partition through application subroutine calls to a system resource manager. These calls create the system memory partition (a logical creation in this case, as the distributed common memory physically resides on each of the participating nodes) and attach the local memory partition to the system memory partition by writing entries to each node's partition RAMs (630, 640). Once these connections are made, address translation hardware intercepts memory reference transactions on the local computer bus. The address translation hardware logic is directed by the identity and validity bits in the partition RAM entry for the memory partition to allow the memory transfers to be replicated onto the system interconnect bus for forwarding to the other nodes participating in the Distributed Common space. The memory references are received by all other nodes that have been attached to the partition with the same system bus operation. This allows computers at several nodes to share the same data and be updated simultaneously with greatly reduced system bus traffic.

The address tranaslation hardware 219, 239, 319, 339 (FIGS. 4A, 4B, 4C, 5A, 5B, 6A, and 6B) that performs the local bus monitoring has hardware routing logic and is dynamically controlled by a software programmable partition RAM 630, 640, illustrated alone in FIG. 7. The partition RAM is a modifiable lookup table which associates the local memory blocks (granularity is assumed to be 256K bytes) with system memory blocks. The partition RAM entries are created by the "attach memory partition" service of the system resource manager. The information resident in the partition RAM includes the local memory address, the system memory address, and whether the actual partition RAM entry is currently active.

Internal memory references occur on the local computer bus and are a result of application task references. I/O, etc. Internal references may be satisfied by local memory, if the memory partition referenced is contained locally, or may be required to be translated into a system interconnect bus address by the address translation hardware and the partition RAMs. External memory references are a result of remote computer memory operations which are projected onto the system interconnect bus and received by a node's interconnect bus interface. These references are translated from interconnect bus references to local computer bus references by the address translation hardware and the partition RAMS.

In the example in FIG. 7, a memory write to a word at address 2148 K (reference number 601 within the block comprising local address between 2048 K and 2304 K a 256 K byte granularity), of Node "A", would be detected by the address translation hardware (not shown). and applied to the partition RAM 630, written to the local address 2148 K and also written to system address 356 K (reference number 605 within the block comprising system addresses between 256 K and 512 K for a 256 K byte granularity). The system memory write would be received by the system bus interface of Node B, and the partition RAM 640 would be accessed to check to see if address 356 K were located in an active partition. If the system memory address was found to be active, the system address would be translated into the local address 868 K (reference number 611 within the block comprising local addresses between 768 K and 1024 K for a 256 K byte granularity), and a local bus memory write would be issued, updating the local memory 610 of Node B. Reads to the memory partitions 601, 611 on either of the Nodes are satisfied locally with no system bus traffic being required.

FIGS. 8A, 8B, 8C, and 8D illustrates schematically a multi-computer architecture having Node A 400, Node B 420 and Node C 440 and a remote global memory 480 interconnected by a common system interconnect bus 460. The interconnect bus is a broadcast bus of the kind disclosed in the aforementioned U.S. patent application Ser. No. 07/232,155, capable of both message and value transfers. Each node includes at least one CPU (not shown) and memory connected to a local computer bus (401. 421. 441), which may be a VME bus alone or combined with a VSB bus. Each node has 4 Gigabytes of memory in its address space which is interfaced to the system interconnect bus 460 by one or more respective partition RAMS (419, 439, 459). The partition RAM information being shown for each node, in order to simplify the illustration, includes information that corresponds to both the system-to-local and local-to-system partition RAMs. In practice, this type information may be kept in a separate system structure related to the system resource manager for the handling and checking of software service requests and is identified in the diagram for illustrative purposes only.

The system of FIGS. 8A, 8B, 8C, and 8D permits all of the possible types of system memory partitioning that may be obtained with the present invention. The system memory has a total system address space conceptually illustrated as block 490 in FIG. 8A. The partitioning function is under control of a software program, the system resource manager, that is executed within the Industry Standard Computer(ISC). The relevant services performed by the system resource manager are subsequently detailed. In an alternate implementation, the system resource manager may reside in a separate computer within the interconnection bus interface of each node (e.g.. 117 and 137 of FIGS. 4A, 4B, and 4C). The interface computer would be tied to the interconnect bus and provide command information to each node via the message passing capability of the interconnection bus 460.

FIGS. 8A, 8B, 8C, and 8D also illustrate a system architecture that provides a logical system address space 490 containing two Distributed Common Memory partitions "DCM 1" 495 and "DCM 2" 493, one System Global Memory partition "SGM 1" 494 and one Remote Global Memory partition "RGM 1" 492. Only the "RGM 1" partition is actually physically resident and allocated in memory that is attached to the system interconnect bus 460. The other partitions are physically resident in the memory of the industry standard computer at each node and only logically allocated within the system memory address space. This address space is administered in software through the services and conventional record keeping data structures of the system resource manager. The data structure that represents the system address space is distributed among, and maintained by, each of the system resource managers on each of the nodes of the system. Maintenance of this and other data structures is synchronized by the use of messaging over the interconnect bus among the nodes, respective system resource managers.

The system memory address space adds the third tier of addressing within the system the system physical address. These addresses are only used on the system interconnection bus 460 and are not used on the local computer nodes. Shaded areas of the diagram denote memory that is not allocated.

The three nodes 400, 420, 440 are shown with different configurations of local memory. Each has an address space of 4 Gigabytes, however, Node A physically has 2 Megabytes, Node B has 8 Megabytes and Node C has 6 Megabytes. Within this physical address space, the local memory blocks that correspond to the system memory partitions have been allocated. The physical location of these partitions is not significant to the memory mapping mechanism of the partition RAMs. Once the local memory partition has been allocated and the system memory partition has been created (by the system resource manager service "create memory partition"), the system resource manager "attach memory partition" service will link these two partitions with an entry of each participating node's partition RAMS (419, 439, 459). The partition RAMs are accessed by the hardware in determining whether local compute node memory references must be directed over the system interconnection bus 460 echoed on both the local and system busses or directed to only the local bus (401, 421, 441). When a distributed common memory location is addressed by a node since the requesting node has that memory present at the node, the system address will be broadcasted onto the interconnection bus and written to the local bus if the request is a write operation. If the request is a read operation, the request is handled as a local read operation and does not reach the interconnection bus.

In addition to the physical memory that is present on each of the nodes, the operating systems on each of the nodes have allocated memory with physical addresses that are not populated by actual memory. This allocation is not prevented by the operating system and is only detected by the operating system when the local computer bus (401, 421, 441) returns a timeout on reference to that memory. In the case of the hardware mechanism that is present in this embodiment, the partition RAM entries on that node do not allow the memory reference to this non-present memory to be issued on the local computer bus. The references are instead sent over the system interconnect bus to be satisfied by either another remote node or by the remote global memory, dependant on the reference. Only if the partition RAM entry is not active does the invalid memory reference make it to the local computer bus. The addition of the partition RAMs and the monitoring hardware allows the local operating system to treat the non-present memory as part of the present computer node's physical memory space.

The partition RAMs are of central importance to the current invention. They provide flexible, programmable mapping of memory partitions on the different computer nodes of the system. Entries in the partition RAMs contain data that includes the local physical block address (blocks have a granularity of 256K bytes in the preferred embodiment), the system physical block address, a valid bit and a bit indicating whether the partition physically resides in the local address space. The validating bit in each partition RAM, if a "1" indicates that a node can receive information off the bus or transmit into the bus however, if the validating bit is a "0", it tells the node to ignore the received information or only to look locally for transmission of information. In the present invention, as seen in FIGS. 8A, 8B, 8C, and 8D, physical addresses (e.g., the address corresponding to partition "DCM 1") can define the same shared memory location via the use of the partition RAMs at each node. If the address is not in the partition RAM, the transaction must be completed by the local bus. If the address is in the partition RAM, the translated address and data goes to the system bus. All units including the originator monitor the system bus and process the transaction if the entry is valid on the incoming partition RAM.

Figure 8:
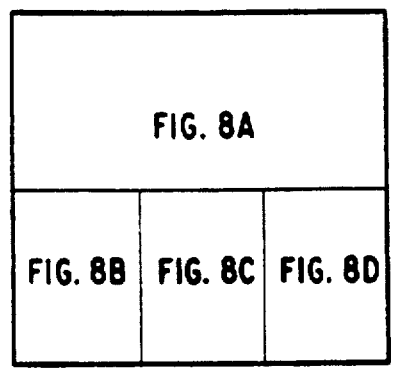
FIGS. 8, 8A, 8B, 8C, and 8D are a schematic diagram of a three node system that embodies the present invention.
Figure 8A:
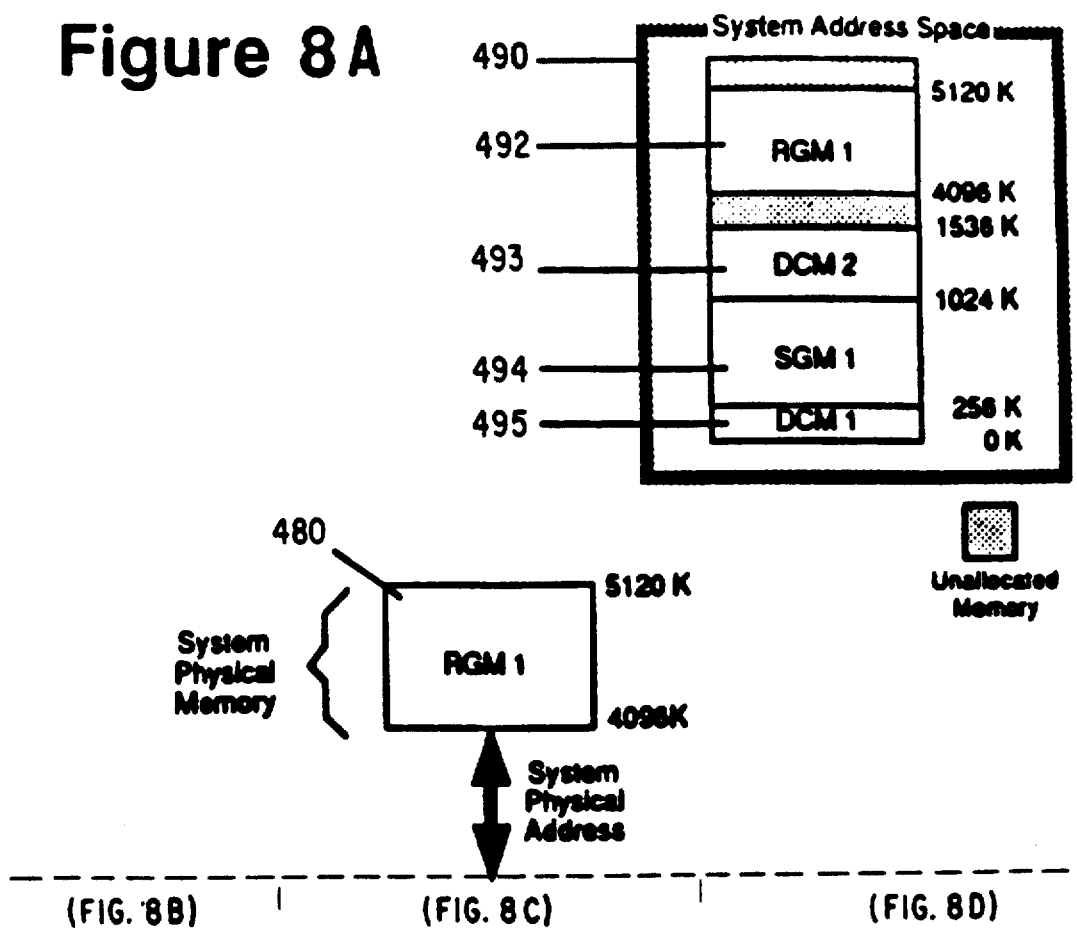
Figure 8B:
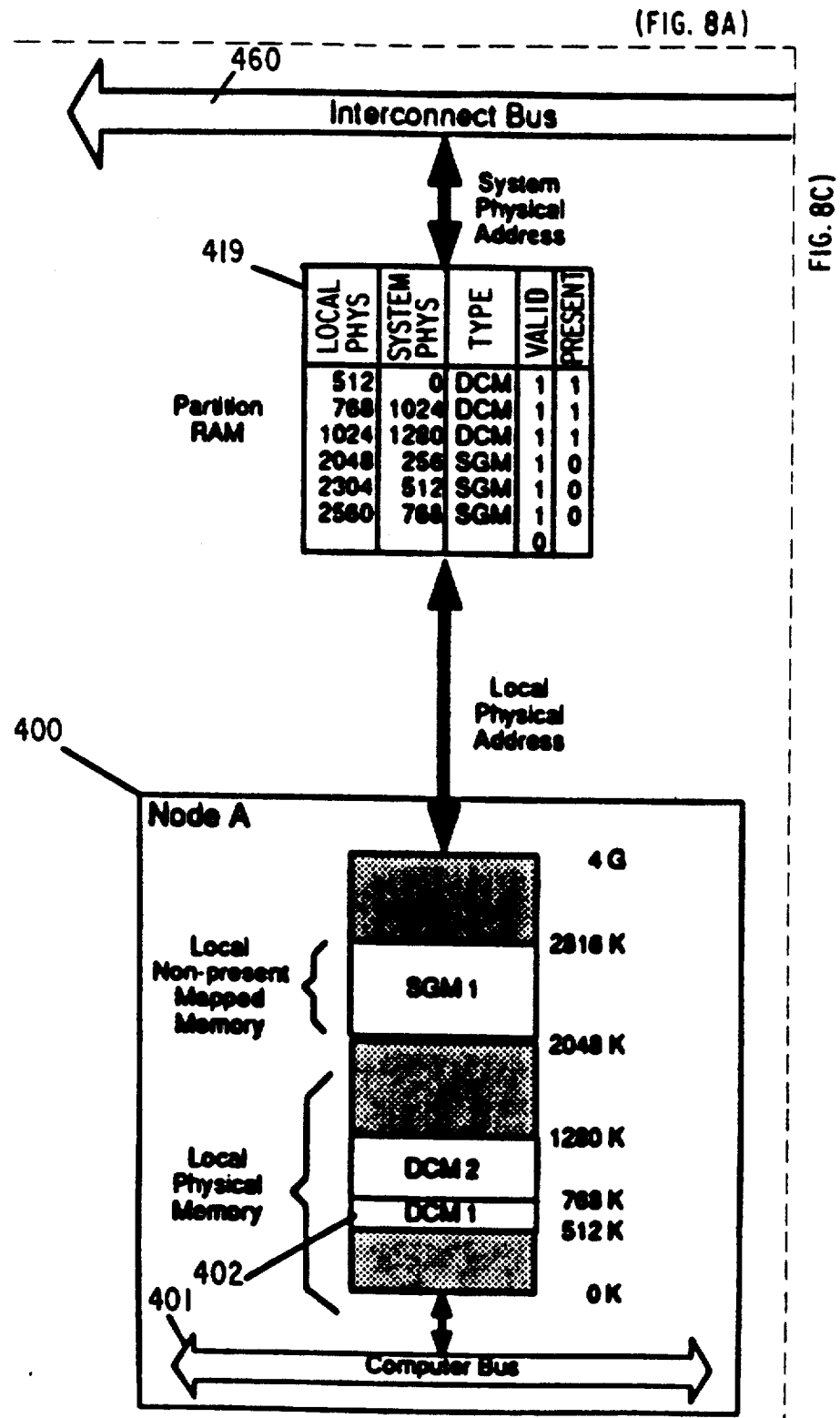
Figure 8C:
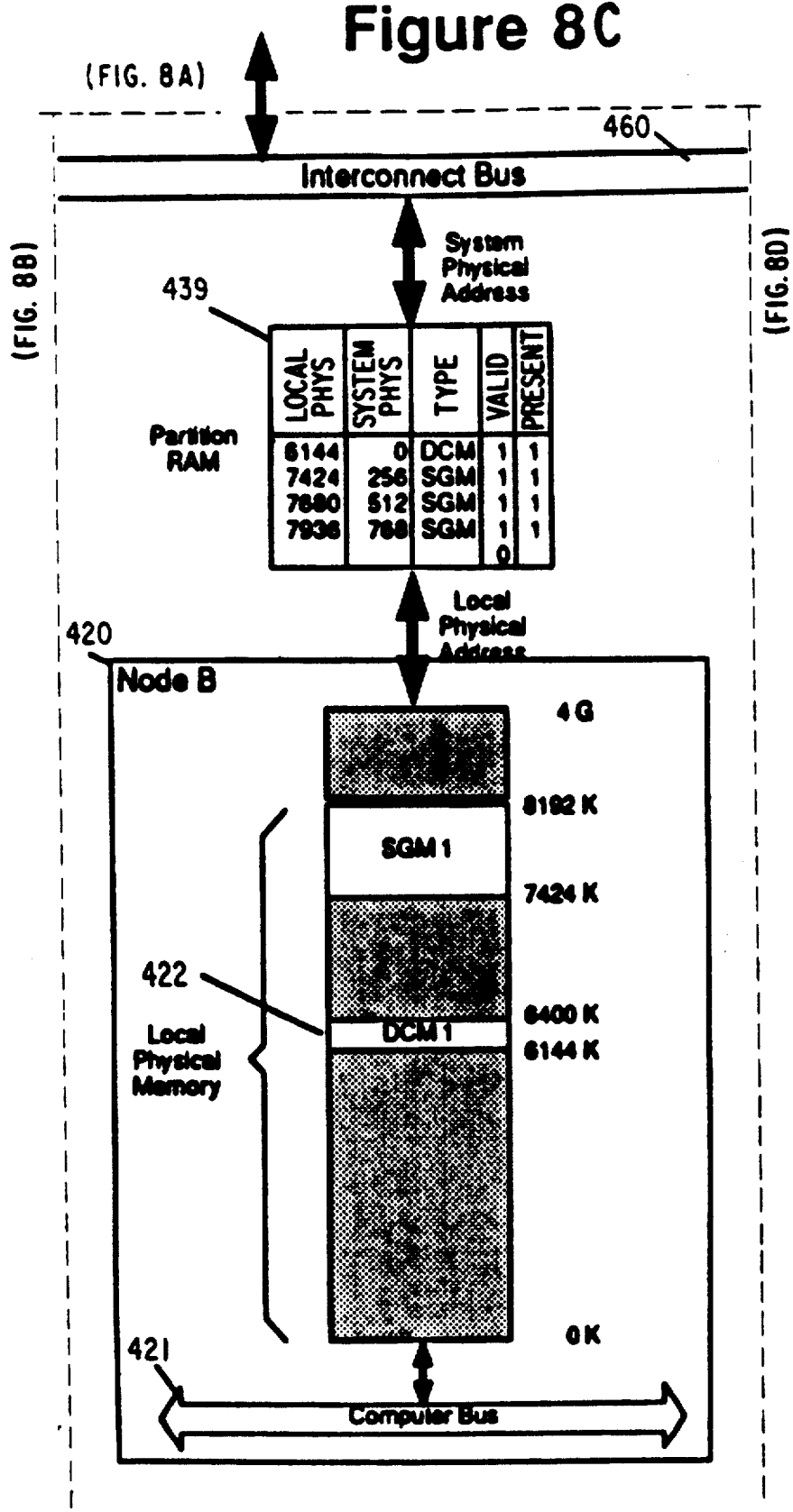
Figure 8D:
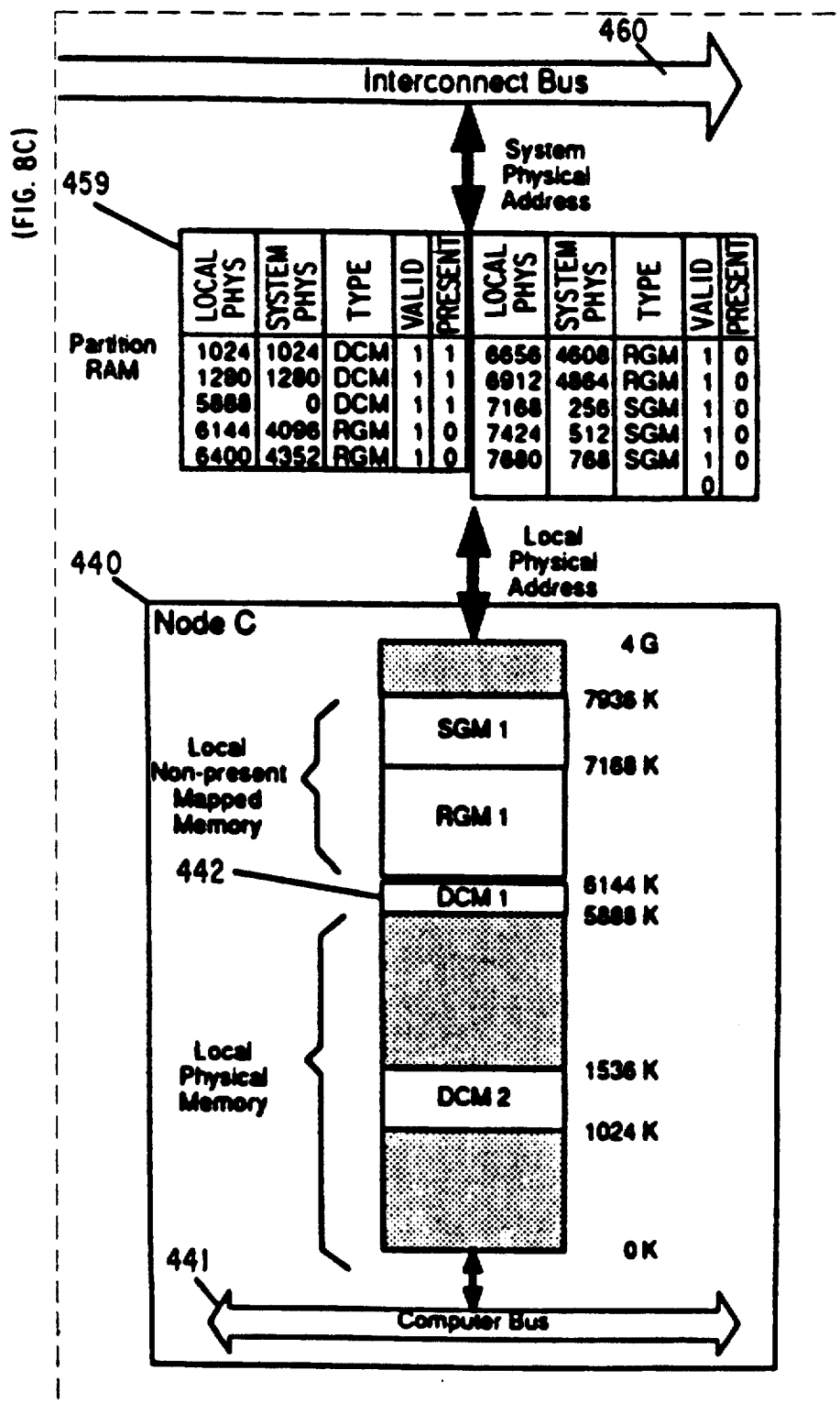

It should be noted in the above discussion that FIGS. 8A, 8B, 8C, and 8D are representational and, for convenience of illustration, do not show the local-to-system partition RAM and its entries The two separate partition RAMs are organized for speed of access for data originating from the system interconnect bus to the local node (system-to-local) and the local node to the system interconnect bus (local-to-system). The most significant 14 bits of an address (in the preferred embodiment) are used as an index into the proper partition RAM and the entry at that index is examined for the proper action. As seen in FIG. 8B, the DCM 1 partition of Node A is identified by a single block address (402 419) which has a logical system address of 0. This condition is entered into the partition RAM 419 in Node A, together with information concerning the type of memory (here DCM), an indication that the connection is valid (by a bit turned on, or a value of "1") and an indication that the memory is physically present at that particular node (by a bit turned on, or a value of "1"). Similar entries are made in the partition RAM tables in the Node B, e.g., RAM 435, and Node C, e.g., RAM 459.

A node can always allocate a block in local memory solely for local storage and access. Such allocation would not require entry into the partition RAM or the attention of the system resource manager.

By way of example, and referring to FIGS. 7 and 8A, 8B, 8C, and 8D, consider a system consisting of three nodes with differing memory sizes, each of which hosts a task that wishes to share a common memory partition for communications purposes with the other two tasks on the other two nodes. The three-step process to achieve this memory rendezvous requires the allocation of a memory partition of proper size under each node's local operating system the creating of the Distributed Common Memory (DCM) partition within the multicomputer system address space and, finally, the connection of the DCM partition to each of the node partitions.

Each local task is required to allocate the local memory partition itself, with a call to the local operating system's memory allocate service. Once the local partition has been created successfully two software service calls to the system resource manager will create the system memory partition and link the local and DCM partitions. These two calls are "create memory partition" and "allocate memory partition." The "create memory partition" service will first examine the system partition table to see if a partition of that name has already been created whether there is enough room in the system address space to fit that size partition. etc. If there is any error, a message will be returned to the calling task that identifies the error. If the checking is completed without an error, the system resource manager formats a message that will be broadcast to the other system resource managers of the system that requests that all of the system resource managers create the partition in their system address spaces. All system resource managers of the system receive this message at the same time and all will create the partition upon receipt of this message.

The next system resource manager service, "allocate memory partition" links the local memory partition to the system memory partition by writing the proper information into the partition RAMs for that node and activating those partition RAM entries. Each partition RAM entry represents a block of memory of the granularity size; in the preferred embodiment, this size is 256K bytes. In the local-to-system partition RAM each entry corresponds to the local memory blocks and indicates whether references to those blocks of memory are to be mapped onto locations in the system address space. In the system-to-local partition RAM, each entry corresponds to the system address space and indicates whether references to blocks of memory in the system address space on the interconnect bus are to be mapped onto locations in local memory.

The use of these memory blocks by the industry standard computer on a computer node proceeds in all cases as if the memory were situated local to the node. In fact, however the memory partition could be resident on another node or even in the remote memory attached to the interconnect bus. The entries in the partition RAM indicate whether the references (reads or writes) can be satisfied locally or must wait to be satisfied through a value reference on the interconnect bus.

A reverse of the creation/allocation procedure will deallocate and delete memory partitions within the system. The "deallocate memory partition" and "delete memory partition" services accomplish the disabling of partition RAM entries that correspond to a particular memory partition and the removal of that memory partition from the system address space.

When a shared global memory partition is to be used, the creation of the partition and the attachment to a given node proceeds in a similar manner. However, since the memory is shared it may not be physically present at all nodes having access to that memory partition, as in Nodes A and C. Accordingly, when there is no physical presence, the related partition tables (419, 459) would place a "0" in an appropriate location rather than a "1" in particular table 439. Mapping of a remote global memory capability would be similarly reflected in the partition map of those nodes sharing that resource, the presence bit being a "0" to indicate that the remote global memory is a local non-present mapped memory as in table 459 of Node C.

Figure 9:
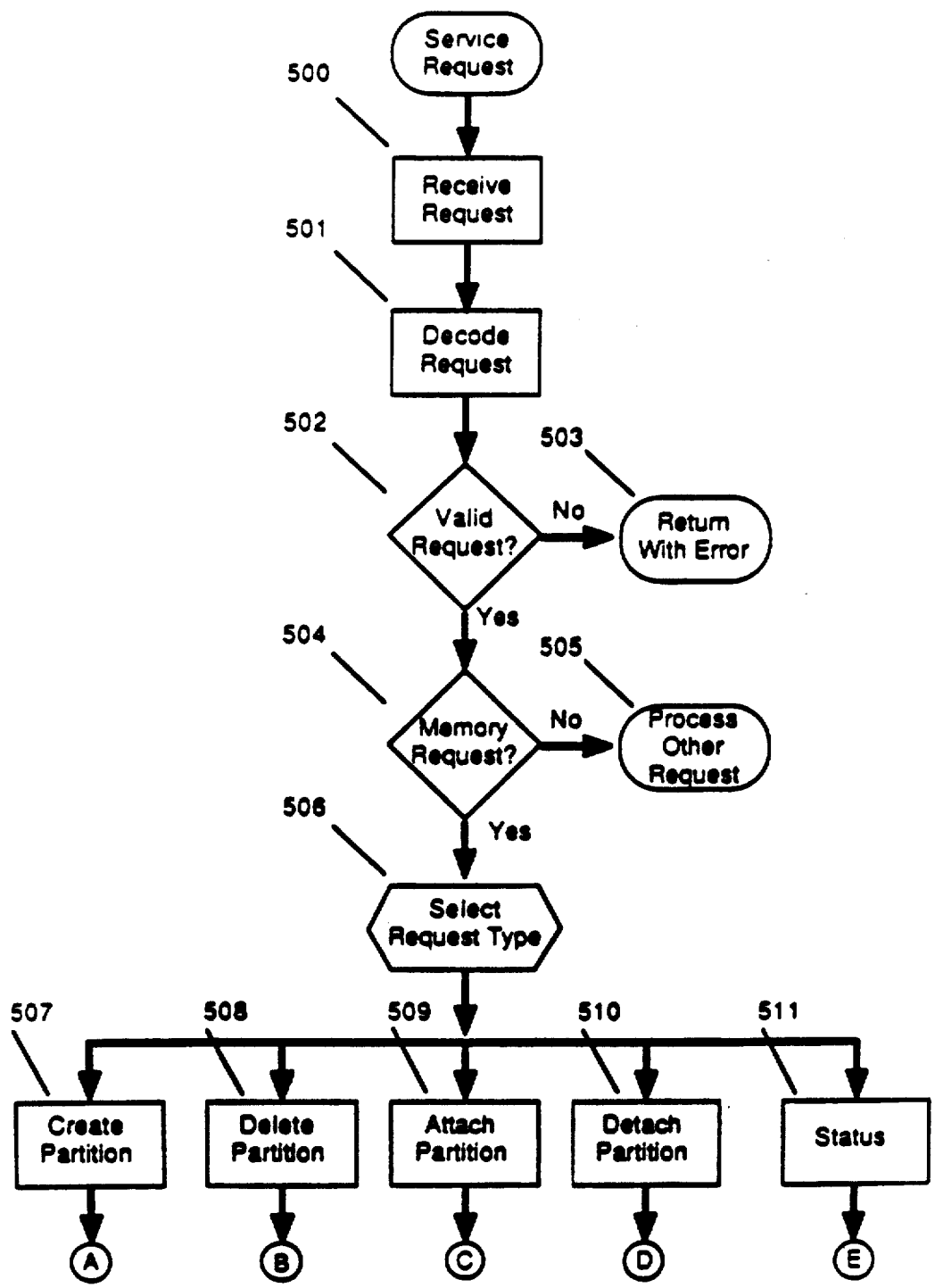
FIG. 9 is a flow chart of the logic steps involved in managing the several memory partition operations.

FIG. 9 illustrates the high level program flow for receiving and decoding service requests to the system resource manager. This software module receives service requests ascertains the validity of the requests, performs the actions on behalf of those requests keeps records and updates data bases to track the changes in the system environment due to the fulfillment of these services and returns the results of the performance of these services.

When a message packet containing a service request is received by the service interface (Step 500), that message packet is decoded (Step 501) according to a predetermined service request protocol. This protocol describes the format of the service requests and the responses that are returned to the requesting tasks. The message packet provides information identifying the requesting task the type of service requested and the parameters that are required by that service request. If the requested service type is not valid, an error message response packet is created and returned to the requesting task (Steps 502, 503). If the requested service type does not pertain to system memory, it is handled by other software routines not described by this document (Steps 504, 505). If the service request pertains to system memory, the service type is used to direct the program flow to the proper handling routine (Steps 506-511).

Figure 10:
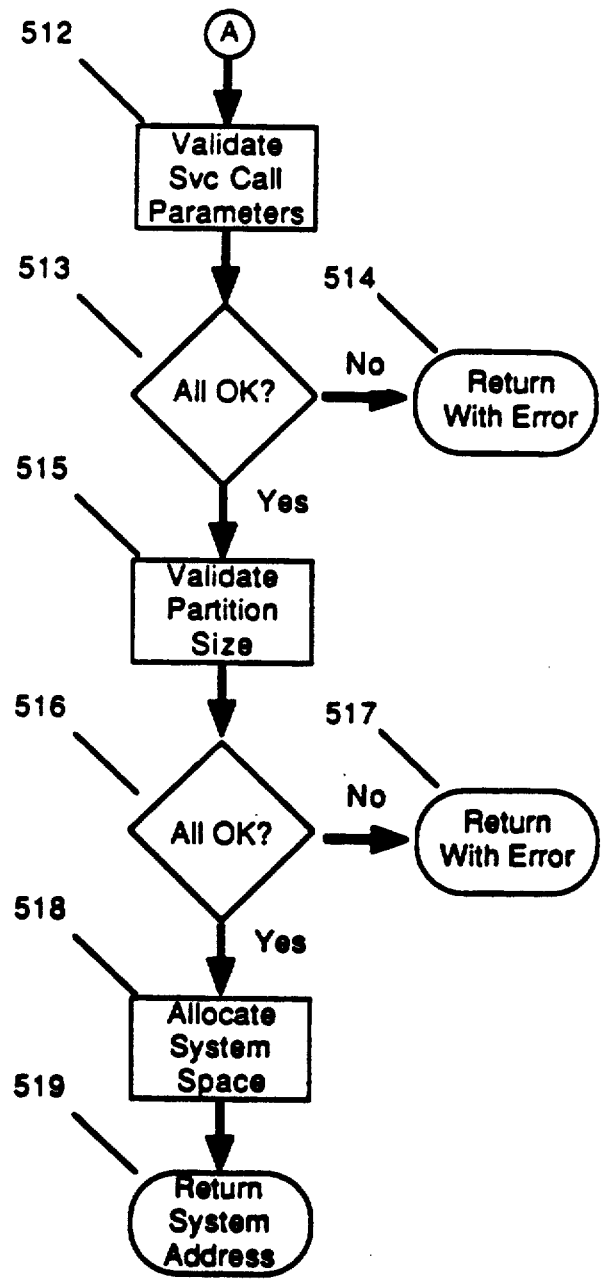
FIG. 10 is a flow chart of a series of logic steps for creating a partition.

FIG. 10 illustrates the program flow when the service requested is "create memory partition." Each of the individual service call parameters is validated for being within the prescribed ranges (Steps 512, 513). These parameters include a unique identifier for the partition, the partition type (Distributed Common, Shared Global or Remote Global) and the size of the partition. If any parameter is deemed incorrect, an error message response packet is created and returned to the requesting task (Step 514). Next the system partition table is read and a best-fit algorithm of the type known in the art, is performed on the address space to ascertain whether the partition will fit within the system memory address space (Step 515). If the address space is insufficient, an error message response packet is created and returned to the requesting task (Step 517). Otherwise, the system partition table is locked from other changes, is updated with the new partition information and unlocked on completion of the allocation (Step 518). A return message is created and returned indicating to the requesting task that the "create memory partition" was successful and passing back to that task the starting system physical address of the partition (Step 519).

Figure 11:
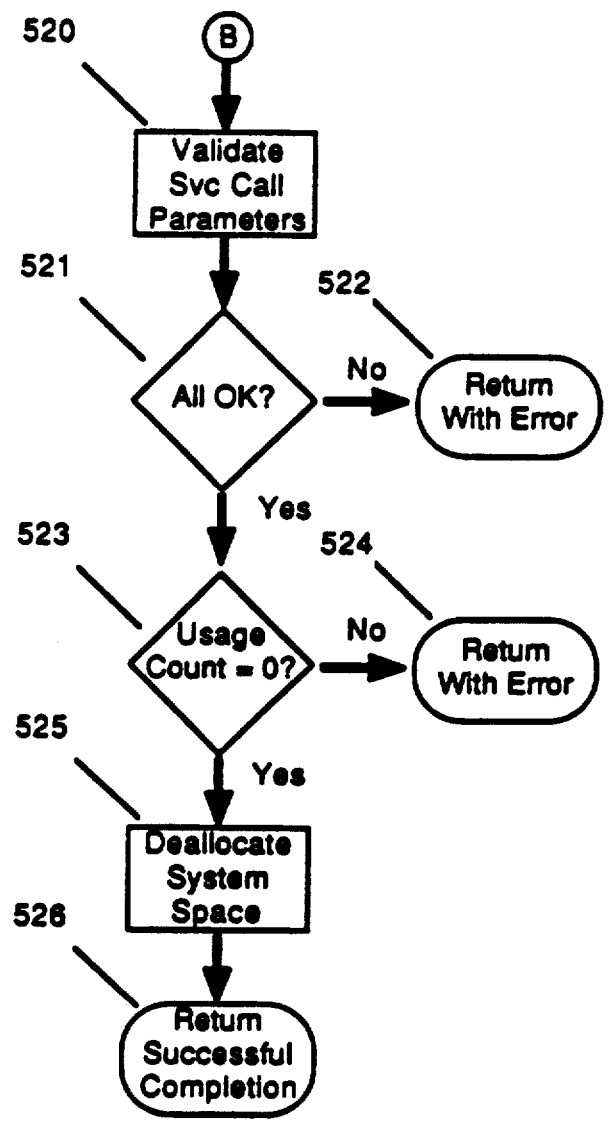
FIG. 11 is a flow chart of a series of logic steps for deleting a partition.

FIG. 11 illustrates the program flow when the service requested is "delete memory partition." Each of the individual service call parameters is validated for being within the prescribed ranges (Step 520). These parameters include a unique identifier for the partition. If the partition identified does not exist or its usage count (i.e. number of attached local memory partitions) is non-zero, an error message response packet is created and returned to the requesting task (521-524). Otherwise, the system partition table is locked from other changes, the entry for the partition is deleted and unlocked on completion of the deletion (Step 525). A return message is then created and returned indicating to the requested task that the "delete memory partition" was successful (Step 526).

Figure 12:
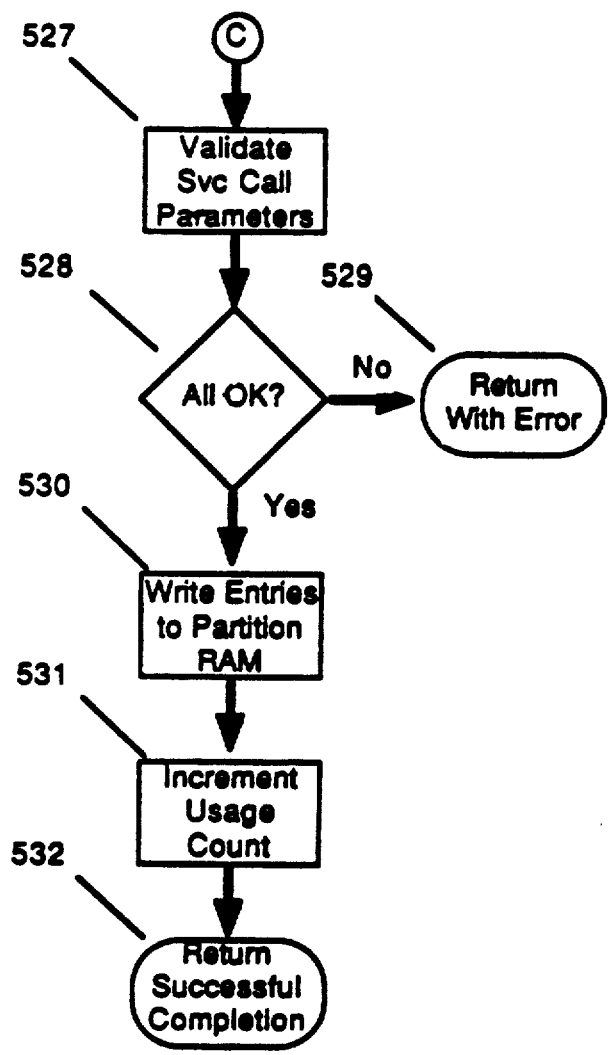
FIG. 12 is a flow chart of a series of logic steps for a functional unit attaching to a partition.

FIG. 12 illustrates the program flow when the service requested is "attach memory partition." Each of the individual service call parameters is validated for being within the prescribed ranges (Step 527). These parameters include the system partition identifier, the local physical address and the type and size of the partition. These parameters are checked against the system partition table for correlation. If the system partition identified does not exist, if the type and size do not match or if that local computer already has attached to that system partition (only one attach partition service call is necessary for each local computer that participates in System Global or Common memory), an error message response packet is created and returned to the requesting task (Steps 528, 529). Otherwise, the entries in the Partition RAM corresponding to the local physical addresses are loaded with the associated system physical addresses and marked as valid entries (Step 530). The usage count for that system partition is also incremented (Step 531). A return message is then created and returned indicating to the requesting task that the "attach memory partition" was successful (Step 532).

Figure 13:
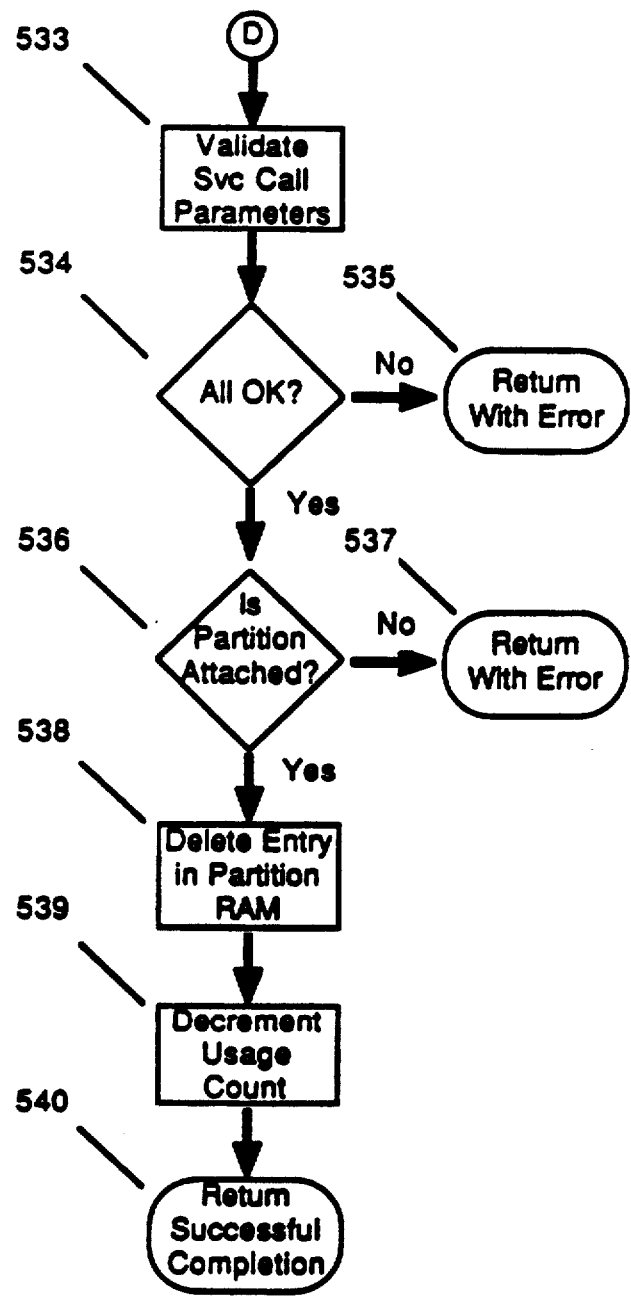
FIG. 13 is a flow chart of a series of logic steps for a functional unit detaching from a partition.

FIG. 13 illustrates the program flow when the service requested is "detach memory partition". Each of the individual service call parameters is validated for being within the prescribed ranges (Step 533). These parameters include the system partition identifier and the local physical address and size of the partition. These parameters are checked against the system partition table for correlation If the system partition identified does not exist if the size does not match, or if the local computer is not attached to that system partition, an error message response packet is created and returned to the requesting task (Steps 534–537). Otherwise, the entries in the partition RAM corresponding to the local physical addresses are marked as invalid entries (Step 538) and the usage count for that system partition is decremented by one (Step 539). A return message is then created and returned indicating to the requesting task that the "detach memory partition" was successful (Step 540).

Figure 14:
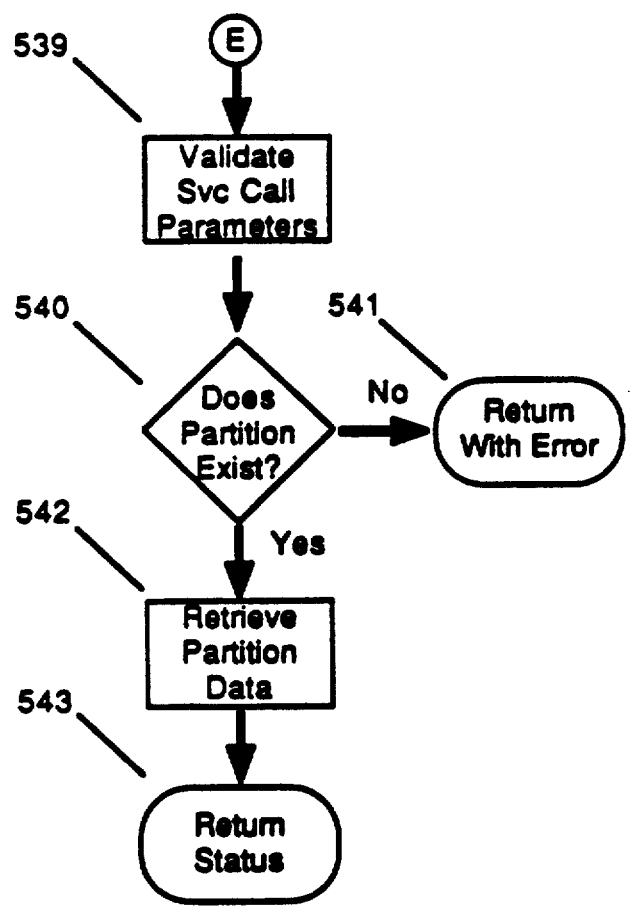
FIG. 14 is a flow chart of a series of logic steps for a functional unit determining the status of a partition.

FIG. 14 illustrates the program flow when the service requested is "memory partition status." With this service, information on any individual (or all) system memory partition(s) may be retrieved, including usage count, size, whether the local computer system is attached to the system partition and the corresponding local physical address of that partition. The service call parameter is validated for being either blank (for all partitions) or a valid system partition identifier (for information on a specific system partition) (Step 539). If the system partition identified does not exist, an error message response packet is created and returned to the requesting task (Steps 540. 541). Otherwise the system partition table and the local partition table are referenced (Step 542), and a return message is created and returned containing the requested data (Step 543).

Whereas the present invention has been defined in terms of an illustrative example utilizing a block diagram presentation, it is contemplated that alternations and modifications of the system as well as the various interrelationships of the illustrated components will be apparent to those of ordinary skill in the art having read the foregoing disclosure. For example, the description of the preferred embodiment herein has clear application to digital telecommunications structures and applications, including speech and video processing and switching applications. Moreover media for interconnecting nodes other than wire buses may be used e.g. optical fiber and the like. Accordingly, the particular apparatus described is for purposes of illustration and the appended claims are to be interpreted as covering all modifications and alterations that fall within the true spirit and scope of the invention.

We claim:

1. In a distributed processing system comprising read/write path means for carrying memory address and data information and connecting a plurality of nodes, each node comprising at least computer means and local memory connected by a local bus and means for partitioning said memory into one or more partitions, the method of a first node writing in a broadcast mode to one or more other nodes comprising:

at said first node;
  addressing a local memory partition with a local physical address;
  converting said partition location physical address to a system physical address;
  writing to said system physical address on said read/write path; and
at said others of said plurality of nodes:
  detecting said system physical address from said read/write path,
  converting said system physical address to a local memory partition address, and
  writing to the local memory partition at each said other nodes.

2. In a distributed processor system having a plurality of nodes, at least two of said nodes having a computer connected by a primary bus to a local memory comprising a local addressable space having physical addresses, said nodes being connected by an interface to a secondary bus for carrying value and message transactions, said nodes further including an address translator and together defining a system physical address space;

the method of establishing distributed common memory comprising:
at a first node:
  establishing in its local physical memory a local memory partition having local memory addresses;
  identifying a system address space partition, corresponding to said local memory address partition;
  loading its address translator with said local physical and system physical memory addresses; and
  informing other nodes to establish similar partitions by message transaction broadcast on said secondary bus; and
at each other of said plurality of nodes:
  responding to said first node information concerning the establishment of a local memory partition by establishing in its local memory a local memory partition;
  identifying the system physical address space corresponding to said local physical memory address partition; and
  loading its address translator with said local physical and system physical memory addresses.

3. In a distributed processor system having a plurality of nodes, at least two of said nodes having a computer connected by a primary bus to a local memory comprising a local addressable space, said nodes being connected by an interface to a secondary bus operative to carry value and message transactions, the method of establishing shared global memory comprising:
at a first node at which a distributed common memory is physically resident:
  establishing in its local memory a local physical memory partition having a local memory address;
  establishing a system physical address space partition, corresponding to said local memory address partition;
  informing other nodes that said partition has been established by message transactions broadcast on said secondary bus; and
  loading an address translator with said local physical and system physical addresses; and
at each other of said plurality of nodes at which said distributed common memory is not physically resident,
  responding to said first node message information by establishing a non-present memory a local memory partition having a local physical memory address;
  identifying said system address space with said local physical memory address; and
  loading said address translator with said local physical and system physical memory addresses.

4. The system of claim 3 wherein said shared global and remote global memory is accessed through communications path writes and reads.

5. In a distributed processing system having an interconnect bus for carrying value and message transfers among a plurality of nodes in a broadcast mode, each of which comprises a computer means and an address conversion means and at least one of which comprises memory, a method for the computer means at a first node to address the memory in at least one of a plurality of second nodes comprising:
   generating at said first node a first node logical address;
   converting said first node logical address to a first node physical address;
   converting said first node physical address to a system physical address;
   transmitting said system physical address to said plurality of nodes via said interconnect bus;
   receiving said system physical address at said plurality of second nodes, including said at least one node having memory;
   converting said system physical address to a second node physical address; and
   using said second node physical address to address said second node memory.

6. The method of claim 5 wherein said first node physical address comprises a first and second address portion and said method further comprises:
   providing said first portion to said first interface means;
   said converting step comprises providing said second portion to said address conversion means, said address conversion means comprising a programmable store having third address portions;
   outputting a third address portion to said interface in response to said second address portion; and
   combining said first and third address portions into a system physical address.

7. The method of claim 5 wherein said first node physical address to system physical address conversion step comprises reading out a stored system physical address in response to an input first node physical address.

8. The method of claim 5 wherein said system physical address to node physical address conversion step comprises reading out a stored second node physical address in response to an input system physical address.

9. The method of claim 5 further comprising creating partitions in said memory in at least one node, said partitions having local physical addresses and being identifiable by system physical addresses.

10. The method of claim 9 further comprising allocating various ones of said partitions to selected memory (tasks) as required and deallocating those allocated partitions that are not required.

11. The method of claim 9 further comprising the steps of:
   creating a system partition and creating a local partition prior to creating said system partition.

12. A data communications system, having a system address space, comprising:
   a common communications path for carrying information as message and value transactions;
   a plurality of communication nodes connected by said path, each of said nodes comprising computing means, memory comprising a local address space identified by local physical addresses, interface means connecting said computing means and memory to said common path, each of said nodes being operative via said interface means to broadcast data and system address information to a plurality of said nodes via said common path and to detect data and system physical address information present on said path, and address translation means operative to convert local memory physical addresses into system physical addresses and to convert system physical addresses to local memory physical addresses, whereby the computing means of a first node can write into memory of a second node as a local first node write operation.

13. The data communication system of claim 12 further comprising:
   remote global memory means having addressable memory forming a part of said system address space.

14. The data communication system of claim 12 wherein said local memory at each node is divisible under control of said computing means into distributed common memory and shared global memory.

15. The data communication system of claim 12 wherein said address translation means performs local to system address conversions on the basis of blocks of memory addresses.

16. A distributed processing system comprising:
   read/write path means for carrying information as message and value transactions,
   a plurality of nodes operative to read from or write to said path means, said plurality of nodes comprising:
   at least a first node comprising first computing means, first memory means comprising a first local address space identified by first local physical addresses, first local bus means, said first local bus means providing a communications path for said first computing means and first memory means within said node, and first interface means for interfacing said first node to said read/write path means,
   at least a second node comprising second memory means comprising a second local address space identified by second local physical addresses and second interface means for interfacing said second node to said read/write path means, and
   means for dynamically partitioning said first memory means and allocating selected ones of the first memory partitions and said second memory means into a system address space identified by system physical addresses, said first computing means being operative to perform read/write operations in said system address space using a local physical address of said node;
   wherein each of said first nodes comprises address translation means responsive to at least certain of said physical addresses in said first local address space for translating a local physical address into a system physical address in said system address space and address translation means responsive to at least certain of said system physical addresses for translating said system physical addresses to respective local physical addresses.

17. The system of claim 16 wherein said second node comprises address translation means responsive to addresses in said system address space for translating a system physical address into a physical address in said second local address space.

18. The system of claim 16, or claim 17 wherein said address translation means comprises at least one partition RAM for identifying said first memory partitions.

19. The system of claim 16 or claim 17 wherein said address translation means is modifiable by selectively loading said means with local physical address and system physical address information.

20. The system of claim 16 wherein said second node further comprises at least a second computing means, second local bus means providing a communications path for said second computing means and said second memory means within said node and second interface means for interfacing said second node to said read/write path means.

21. The system of claim 16 further comprising a plurality of said first nodes, each said first node having a partitioning means and the first memory means in each said first node being dynamically partitionable by said partitioning means in response to message information from computing means at any first node whereby the system memory capacity, as defined by said system address space, may be allocated to individual first nodes.

22. The system of claim 16 wherein said address translation means comprises a system resource manager and a partition RAM operatively connected to said system resource manager, said manager comprising a processor for programming address translation information into said partition RAM.

23. The system of claim 22 wherein said system resource manager at each said first node maintains a record of the allocation of memory in said first memory means at said first node.

24. The system of claim 22 wherein each said system resource manager comprises means for creating a partition in said local memory, means for attaching said memory partition in said local memory, means for detaching an attached memory partition and means for deleting a partition in said local memory.

25. The system of claim 16 comprising a plurality of first nodes wherein said system address space comprises any one or more of remote global memory distributed common memory and shared global memory.

26. The system of claim 16 comprising a plurality of first nodes wherein the computing means at any first node can command the partitioning of memory at any other first node by message transactions on said read/write path and can perform read/write operations to partitioned memory at any other first node by value transactions.

27. The system of claim 16 further comprising cache memory at a node, said memory being operative to cache data in said system address space, regardless of the particular node at which said cache memory is physically located.

28. The system of claim 27 wherein at least one of said nodes further comprises cache memory said cache being operative to cache both local memory writes and remote memory writes.

29. The system of claim 16 wherein said second node comprises a global memory resource occupying at least a part of said system address space, said global memory resource being accessible by any processor in any of said first nodes via a physical system address.

30. The system of claim 16 wherein said first computing means comprises a digital computer.

31. The system of claim 16 wherein said first memory means on any first node having a first local address may be addressed by said computing means in any other first node as a local read/write operation to a local address which need not be said first local address.

32. The system of claim 16 wherein at least one of said first computers is allocated at least a defined portion of said system address space and can cache any area of said defined address space.

33. A distributed processing system comprising:
(i) read/write path means for broadcasting memory address and data information,
(ii) a plurality of first nodes operative to read from and write to said path means, each first node comprising computing means, local memory and local bus means connecting said computing means, and said local memory and
(iii) system memory means, said system memory means being resident on at least one second nodes and comprising at least one of:
remote global memory, said memory being resident on said at least one second node and being operatively connected to said communications path and being accessible as system physical address space via said path by the computer means in said first nodes,
shared global memory, said memory being resident on one of said first nodes and being accessible as system physical address space by the computer means in any other of said first nodes, and
distributed common memory, said memory being resident on one or more selected said first nodes and being accessible as system physical address space having the same physical address for all of selected first nodes.

34. The system of claim 33 wherein said distributed common memory is written into via said communications path write transfers and is read through local read cycles.

35. The system of claims 16 or 33, wherein said local memory for said respective first nodes may be of dissimilar sizes.

* * * * *